US007574949B2

(12) United States Patent
Hadaway et al.

(10) Patent No.: US 7,574,949 B2
(45) Date of Patent: Aug. 18, 2009

(54) COMPUTER NUMERICALLY CONTROLLED TABLE SAW FENCE

(76) Inventors: Jeffrey P. Hadaway, 236 Adams, Cottage Grove, OR (US) 97424; Timothy C. Whitford, 150 Thornton Rd., Cottage Grove, OR (US) 97424; Stephen Gorey, 10918 N. Pomegranate Dr., Oro Valley, AZ (US) 85737

( * ) Notice: Subject to any disclaimer, the term of this patent is extended or adjusted under 35 U.S.C. 154(b) by 379 days.

(21) Appl. No.: 11/198,371

(22) Filed: Aug. 5, 2005

(65) Prior Publication Data

US 2005/0268764 A1 Dec. 8, 2005

(51) Int. Cl.
*B23D 45/06* (2006.01)

(52) U.S. Cl. ........................................ 83/446; 83/477.2

(58) Field of Classification Search .................. 83/438, 83/477.2, 446
See application file for complete search history.

(56) References Cited

U.S. PATENT DOCUMENTS 4,206,910 A * 6/1980 Biesemeyer ................ 269/236
5,524,514 A * 6/1996 Hadaway et al. ............. 83/76.9
6,851,345 B1 * 2/2005 Kennelly et al. .............. 83/438
7,231,858 B2 * 6/2007 Oberheim .................. 83/477.2
2002/0157515 A1 * 10/2002 Dick ........................... 83/438
2006/0086222 A1 * 4/2006 Dick ........................... 83/438

* cited by examiner

*Primary Examiner*—Kenneth E. Peterson
(74) *Attorney, Agent, or Firm*—Tod R. Nissle, P.C.

(57) ABSTRACT

A new table saw control system is provided. The system shortens the time required to learn how to operate a table saw, eliminates the necessity of making conversions from one measurement system or unit to another, reduces the likelihood of error occurring during the use of a table saw, and makes a table saw safer to use. The system includes a touch control screen mounted on the fence and moving simultaneously with the fence; and, a plurality of inter-related operational menus operatively associated with the computer and displayed sequentially on the screen and including button images activated by touch to generate signals to the computer to move from one of the menus to another of the menus and to control movement of the carriage and the fence.

1 Claim, 19 Drawing Sheets

COMPUTER NUMERICALLY CONTROLLED TABLE SAW FENCE

This invention pertains to a table saw.

More particularly, the invention pertains to a table saw fence and to a system for controlling movement of the table saw fence.

Fences on some traditional "stationary" table saws depend on manual movement and on physical clamping in order to position and reposition the fence. This in turn relies heavily on human visual accuracy.

Other automated fence systems do not work with stationary table saws, but instead, are components or add-ons to "sliding" table saws. As such, these automated fence systems cannot be retrofitted onto traditional stationary table saws.

Other automated fence systems for sliding table saws also involve a computer and a "stepping" or "ladder" system Other automated fence systems use a "stepping" or "ladder" system on the outside of a rail to find and hold a position for the fence.

Another prior art device is the automated fence system utilized on a saw table in the manner illustrated in FIGS. 1 to 4. The fence system in FIGS. 1 to 4 uses a keypad with a computer chip connected to a motor, and is moved mechanically as opposed to being moved by human hands. Said fence system allows a faster and more accurate setting of distance between the fence and saw blade; is separate from the table; and, can be retrofitted on a standard stationary table saw.

The fence system of FIGS. 1 to 4 utilizes an automated system whereby a keypad attached to the fence 12 sits on top of a microcontroller that instructs a stepper motor (or "servo" motor) 1 the desired distance to move along a rail. The microcontroller is a dedicated unit with a computer chip. A carriage 7 moves the fence 12 along the table saw surface. The fence movement is accomplished along a rail by stepper motor turning an enclosed, dust free, threaded rod 2. The motor turns the rod a certain number of revolutions based on the operator's entry on the keypad.

The automated fence measuring system of FIGS. 1 to 4 utilizes the technology of computer numerically control (CNC) and linear motion in conjunction with a standard table saw. Speed and accuracy are essential and the fence measuring system of FIGS. 1 to 4 exceeds many existing manual systems.

The automated fence system of FIGS. 1 to 4 can be produces at about 1/10 of the cost of many "computerized" fences on sliding table saws; is an "add on" for a traditional stationary table saw and can be retrofitted onto such existing table saws; and, is suitable for making small cuts—in comparison to other sliding table saws that have automated fences and are only economical for cutting large panels.

Operation of the fence system of FIGS. 1 to 4 is as follows. To begin, an operator enters the desired measurement on the keypad, then touches the "move" button and the fences automatically moves to the position entered on the keypad. After make the cut or cuts, the operator can then repeat the process with another measurement entry. By the time the operator has picked up the next piece to be cut, the fence is in position and waiting. Clamping the fence manually is not necessary due to the gearing and holding force of the motor. The keypad is seen in FIG. 1 on fence 12 immediately below power supply 13.

The motor 1 is coupled to a threaded rod 2 with an anti-backlash coupler 5 that moves a bearing 6 attached to a carriage 7 that moves inside an enclosed, dust free, rail 8. The threaded rod is mounted at each end of the rail with a bearing 15 mounted to an end cap 9. The right side end cap also provides a means of mounting the motor 1. The carriage 7 is guided along the rail by wheels 10 that allow left and right lateral movement only. Bracket 11 is mounted to the carriage and is fashioned to also be attached to the fence. The keypad is wired to a microcontroller, a motor drive, and a power supply 13. Also provided are limit switches 14 to control maximum movement of the fence 12 left and right, to keep the fence from contacting the saw blade or motor.

The rail is attached to the front edge of the table saw top, replacing the old rails and fence. A full table extension is required to the right to support the fence at the rear.

The threaded rod drive system can be changed to a belt drive system using gear pulleys at each end cap.

The fence system of FIGS. 1 to 4 can serve in a radial saw fence system where the stop function has a longer distance of travel. A threaded rod is limited to its span of unsupported distance. The fence control system of FIGS. 1 to 4 can be adapted to other systems that require measurement control.

The location of the keypad can be varied. The keypad can, for example, be attached to the base of the table saw, or can be located on an attached or detached arm.

The automated fence system set forth in FIGS. 1 to 4 has disadvantages.

First, the system does not allow for the use of decimal, fraction, and metric measurement systems. Consequently, if an operator has a metric measurement and wishes to enter a decimal measurement in inches (or vice versa), or has a mixed number measure in inches and wishes to enter a decimal measurement in inches (or vice versa), the operator must go through a manual conversion process. While the procedures for mathematically converting metric measurements to inch measurements and for covering decimal measurements to mixed number measurements are well known, many operators are not familiar with such conversion procedures, such conversion processes increases the chances for error, and, such conversion processes are time consuming. It is presently more likely that the operator will face a conversion problem because of the proliferation of metric measurement devices and the use of the metric system along with the conventional measuring system that utilizes the inch as a unit of measurement. Providing the operator with a calculator to facilitate the conversion of metric measurements to inch measurements, of decimals measurements to mixed number measurements, etc. is not viewed as a practical solution to the problem because the same disadvantages are believed to continue to exist, namely, many operators are not familiar with conversion procedures, conversion processes increases the chances for error, and, conversion processes and time consuming. It would be highly advantageous to avoid the conversion process altogether.

Second, the system does not include a locking system that accurately locks a fence in place. Existing cam locks tend to move a fence from its desired position when the lock is engaged. It would be highly advantageous to provide a locking system that automatically and accurately locked the fence in place.

Third, the system does not include a locking system that self-corrects when the fence is inadvertently moved a short distance. If the operator inadvertently hits the fence and knocks the fence a distance from its desired position (which can readily occur when the operator is loading a work piece on the saw table), the operator must unlock and reposition the fence. This is time consuming and also increases the chance for error because the operator tends to be less patient when he has to realign the fence a second (or third) time. It would be highly advantageous to provide a locking system that automatically and accurately self-corrects when the fence is inadvertently (and sometime unknowingly) moved from its desired position.

Fourth, the system does not provide a zeroing or calibration system. This requires the use of a tape measure for each individual cut, or, can require a time intensive routine requiring test cut and the measuring of test cut material to enable a calculation to be performed to determine an entry that can be made into an "automated" system to zero or calibrate the fence. Once the entry is made, additional test cuts typically are required to double check the calibration. These procedure increase the chance of error and are time consuming. It would be highly advantageous to provide a simple calibration system that required very little time to calibrate the fence.

Fifth, the system does not disclose a ergonomically friendly means to turn the saw blade motor on and off. The on/off switch is typically located at a "safe location" under the face of the saw. On/off switches have been so positioned for many years, based on the idea that if the switch is tucked away there is less likely the switch will be inadvertently contacted, causing the saw blade to go on (or off) at an undesirable time. One disadvantage to such a conventional positioning of the on/off switch is that the operator must bend over and move from more erect position in which the operator is ready to place or move a workpiece on the saw table. A second disadvantage is that the operator will, when he leans down to operate the on/off switch, inadvertently contact the workpiece or the fence (i.e., by grabbing or holding the workpiece or fence with his free hand). A third disadvantage is that when the operator leans over to operate the on/off switch, his face often moves closer to the saw blade, which is not desirable. It would be highly advantageous to provide an improved system that would enable the operator to turn the saw blade on and off generally without having to move from his normal erect position standing next to the saw table.

Sixth, the system, due at least in part to the disadvantages set forth above, tends to require more extensive instruction and to require a more extensive instruction manual. It would be highly advantageous to provide an operational system which require a small instruction manual, or, most preferably, was generally "self" explanatory and did not require the operator to study an instruction manual.

Seventh, the system utilizes a keyboard or key pad. A significant limitation of keyboard is that the operator is limited to using the keys on the keyboard. This means macros or function keys or other keyboard procedures must be programmed and developed to enable the saw table control system to perform functions like the calibration of the fence. Keyboard also tend to occupy an undesirably large area. There ordinarily is not sufficient space on a fence to incorporate a large keyboard. A keyboard is therefore highly undesirable in the present invention.

Eighth, a conventional computer monitor and mouse can not, practically speaking, be utilized with the fence system. Mounting a computer monitor on or adjacent the saw table, positioning a mouse on or adjacent the saw table, and using the monitor and mouse produces a bulky and time consuming process. A computer monitor and mouse can not be readily mounted on the fence because of weight, space, and safety limitations. Use of a mouse and its associated computer monitor is highly undesirable in the present invention.

Accordingly, it would be highly desirable to provide an improved automated fence system for a saw table.

Therefore, it is a principal object of the invention to provide an improved fence system for a saw table.

A further object of the invention is to provide an improved saw table fence system that greatly simplifies the procedures required to use a saw table and that significantly reduces the time required to use the saw table.

Another object of the invention is to provide an improved saw table fence system that is user friendly; that can be readily learned by an operator; that permits an operator to position—without having to make a conversion between measuring systems or units—a fence using decimal, fraction, and metric measurement systems; that includes an accurate, automatic locking system; that self-corrects when the fence is inadvertently moved a short distance; that provides a simplified calibration system; and, that facilitates safely operating the motive power used to position the fence.

These and other, further and more specific objects and advantages of the invention will be apparent from the following detailed description of the invention, taken in conjunction with the drawings, in which.

Figure 1:
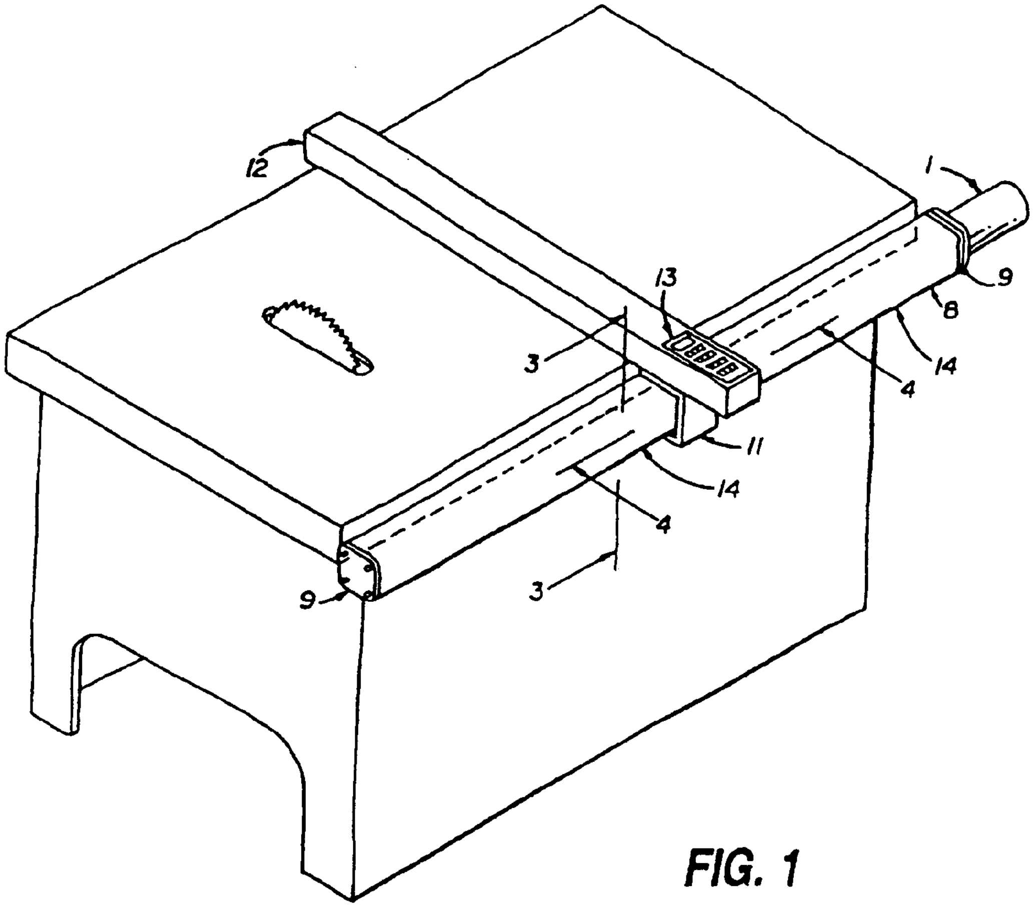
FIG. 1 is perspective view illustrating a complete fence and rail system mounted on a standard stationary table saw.
Figure 2:
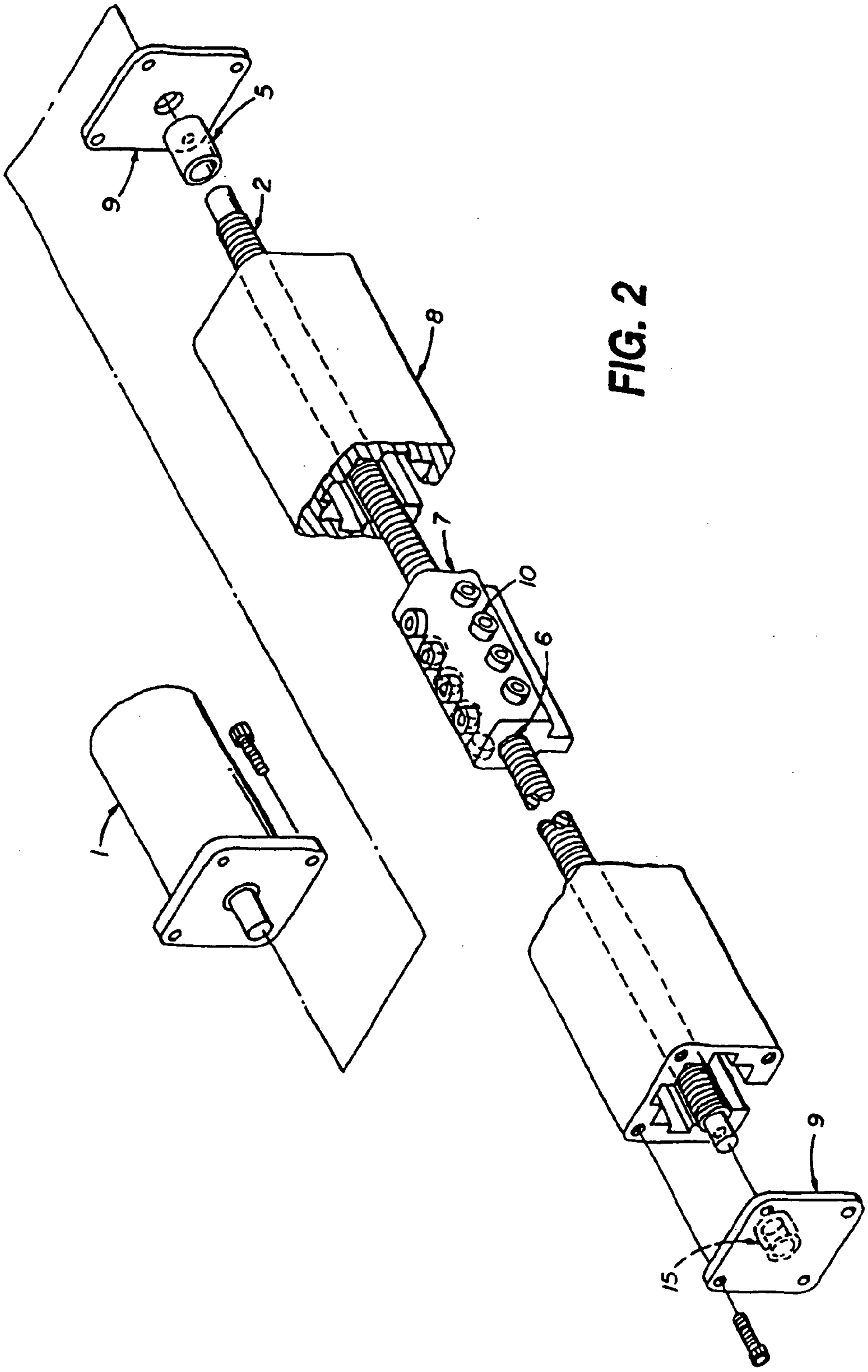
FIG. 2 is an enlarged perspective view illustrating components of the rail section of the invention.
Figure 3:
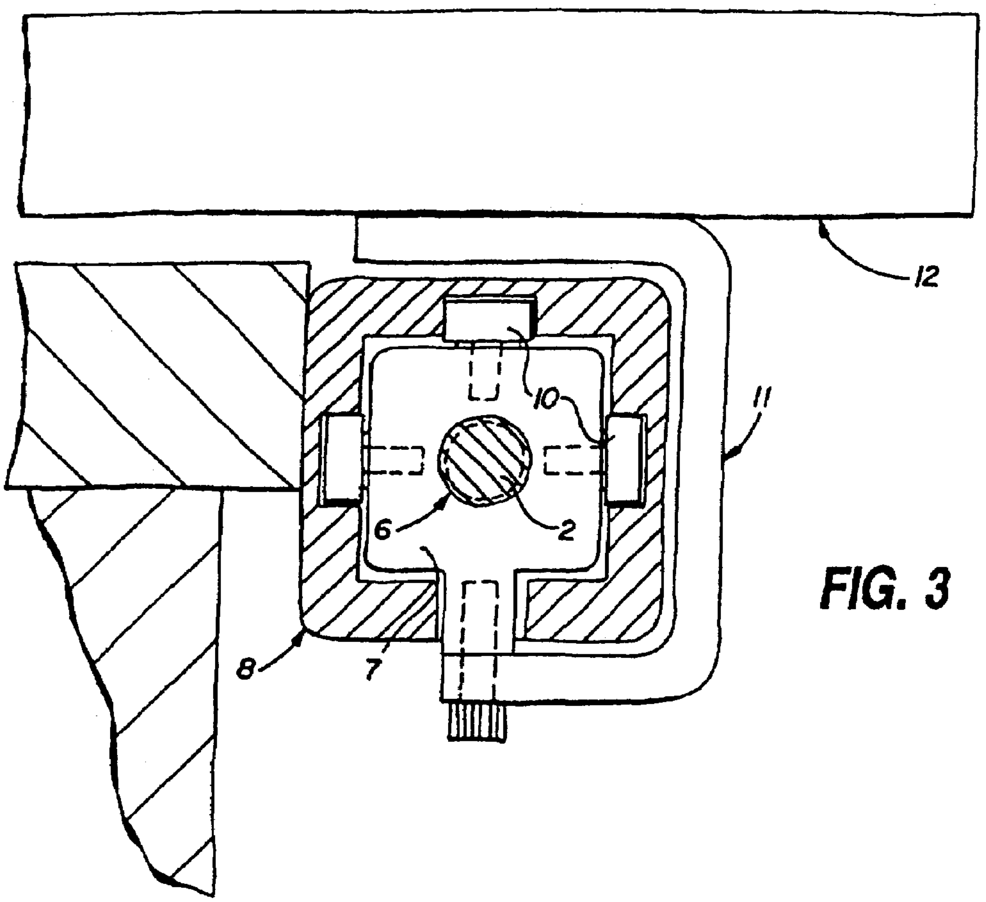
FIG. 3 is a section view further illustrating construction details of the fence and rail system of the invention.
Figure 4:
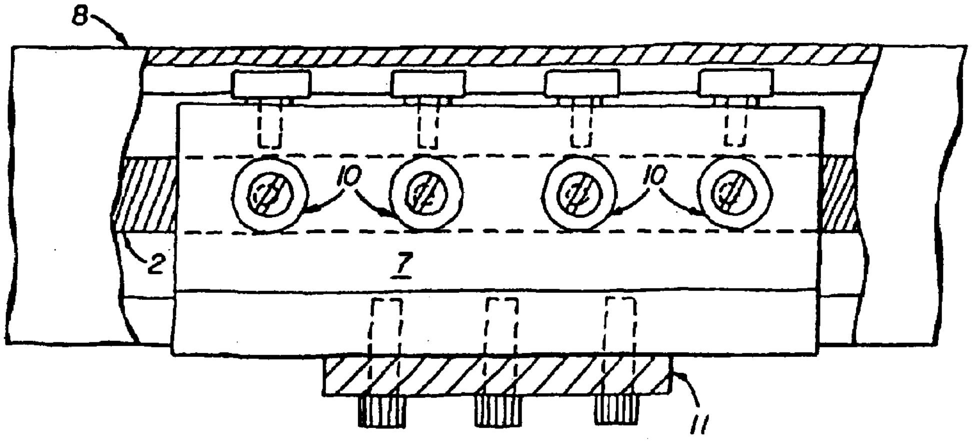
FIG. 4 is a front elevation view illustrating the wheels rotatably mounted on the carriage.

Briefly, in accordance with our invention, we provide improvements in combination with a table saw. The table saw includes a table; a saw mounted on the table; a carriage mounted on the table; a fence attached to the carriage and extending over the table; a motor operatively connected to the carriage to simultaneously move the carriage and the fence between at least two operative positions; and, a computer to actuate the motor to move the carriage and the fence between the operative positions. The improvements facilitate control of the movement of the fence. The improvements include a touch control screen mounted on the fence to input signals to the computer to actuate the motor to move the carriage and the fence. The touch control screen moves simultaneously with the fence; and, displays a plurality of different menus to control movement of the carriage and the fence. At least one of the menus includes touch sensitive buttons to turn the motor on and off.

In another embodiment of the invention, we provide improvements in combination with a table saw. The table saw includes a table; a saw mounted on the table; a carriage mounted on the table; a fence attached to the carriage and extending over the table; a motor operatively connected to the carriage to simultaneously move the carriage and the fence between at least two operative positions; and, a computer to actuate the motor to move the carriage and the fence between the operative positions. The improvements facilitate control of the movement of the fence. The improvements include a touch control screen mounted on the fence to input signals to the computer to actuate the motor to move the carriage and the fence. The touch control screen moves simultaneously with the fence; and, displays a plurality of different menus to control movement of the carriage and the fence. The menus include at least one menu to enter the position of the fence as a mixed number; at least one menu to enter the position of the fence as a decimal number; and, at least one menu to enter the position of the fence as a metric number.

In a further embodiment of the invention, we provide improvements in combination with a table saw. The table saw includes a table; a saw mounted on the table; a carriage mounted on the table; a fence attached to the carriage and extending over the table; a motor operatively connected to the carriage to simultaneously move the carriage and the fence between at least two operative positions; and, a computer to actuate the motor to move the carriage and the fence between the operative positions. The improvements facilitate control of the movement of the fence. The improvements include a locking system wherein the motor is a stepper motor. The locking system also includes a system for determining the location of the fence based upon the number of rotations of the stepper motor; and, once the fence is moved to a selected position and is stopped, for detecting when the fence is inadvertently moved from the selected position, and for activating said stepper motor to move the fence back to the selected position.

In still another embodiment of the invention, we provide improvements in combination with a table saw. The table saw includes a table; a saw mounted on the table; a carriage mounted on the table; a fence attached to the carriage and extending over the table; a motor operatively connected to the carriage to simultaneously move the carriage and the fence between at least two operative positions; and, a computer to actuate the motor to move the carriage and the fence between the operative positions. The improvements facilitate control of the movement of the fence. The improvements include a touch control screen mounted on the fence to input signals to the computer to actuate the motor to move the carriage and the fence. The touch control screen moves simultaneously with the fence; and, displays a plurality of different menus to control movement of the carriage and the fence. At least one of the menus includes at least one touch sensitive button to define the zero position of the fence.

In still a further embodiment of the invention, we provide improvements in combination with a table saw. The table saw includes a table; a saw mounted on the table; a carriage mounted on the table; a fence attached to the carriage and extending over the table; a motor operatively connected to the carriage to simultaneously move the carriage and the fence between at least two operative positions; and, a computer to actuate the motor to move the carriage and the fence between the operative positions. The improvements facilitate control of the movement of the fence. The improvements includes a touch control screen mounted on the fence and moving simultaneously with the fence; and, a plurality of inter-related operational menus operatively associated with the computer and displayed sequentially on the screen and including button images activated by touch to generate signals to the computer to move from one of the menus to another of the menus and to control movement of the carriage and the fence.

In yet another embodiment of the invention, we provide an improved method for retrofitting a table saw. The table saw includes a table; a saw mounted on the table; a rail mounted on the table; a first carriage removably mounted on the rail for movement therealong; and, a first fence attached to the carriage, extending over the table, and removable from the rail with the first carriage. The improved method comprises the steps of providing a carriage-fence assembly mountable on the rail when the first carriage and the first fence are removed from the rail. The carriage-fence assembly comprises a carriage housing shaped to extend at least partially around the rail; a second fence attached to the carriage housing to extend over the table; a drive assembly mounted on the carriage housing to engage the rail and move the carriage-fence assembly along the rail; a motor mounted on the carriage housing and operatively associated with the drive assembly to provide motive power for the drive assembly; and, a control system to generate signals to control the motor to control movement of the carriage-fence assembly along the rail. The method also comprises the steps of removing the first carriage and first fence from the rail; and, mounting the carriage-fence assembly on the rail.

In yet another embodiment of the invention, we provide an improved table saw. The saw includes a table; a saw mounted on the table; a rail mounted on the table; and, a carriage-fence assembly mounted on the rail for movement therealong. The carriage-fence assembly comprises a carriage housing shaped to extend at least partially around the rail; a fence attached to the carriage housing and extending over the table; a drive assembly mounted on the carriage housing to engage the rail and move the carriage-fence assembly along the rail; a motor mounted on the carriage housing and operatively associated with the drive assembly to provide motive power for the drive assembly, and, a control system to generate signals to control the motor to control movement of the carriage-fence assembly along the rail.

The control system can include a computer to actuate the motor to move the carriage-fence assembly along the rail; a touch control screen mounted on the carriage-fence assembly and moving simultaneously with the carriage-fence assembly; and, a plurality of inter-related operational menus operatively associated with the computer and displayed sequentially on the screen and including button images activated by touch to generate signals to the computer to move from one of the menus to another of the menus and to control movement of the carriage-fence assembly, at least one of the menus including touch sensitive buttons to turn the motor on and off.

The control system can include a computer to actuate the motor to move the carriage-fence assembly along the rail; a touch control screen mounted on the fence and moving simultaneously with the fence; and, a plurality of inter-related operational menus operatively associated with the computer and displayed sequentially on the screen and including button images activated by touch to generate signals to the computer to move from one of the menus to another of the menus and to control movement of the carriage and the fence, the menus including at least one menu to enter the position of the fence as a mixed number, at least one menu to enter the position of the fence as a decimal number, and at least one menu to enter the position of the fence as a metric number.

The control system can include a computer to actuate the motor to move the carriage-fence assembly along the rail; a touch control screen mounted on the fence and moving simultaneously with the fence; and, a self-correcting locking system wherein the motor is a stepper motor; and, including a system for determining the location of the fence based upon the number of rotations of the stepper motor; and, once the fence is moved to a selected position and is stopped, for detecting when the fence is inadvertently moved from the selected position, and activating the stepper motor to move the fence back to the selected position.

The control system can include a computer to actuate the motor to move the carriage-fence assembly along the rail; a touch control screen mounted on the fence and moving simultaneously with the fence; and, a plurality of inter-related operational menus operatively associated with the computer and displayed sequentially on said screen and including button images activated by touch to generate signals to the computer to move from one of the menus to another of the menus and to control movement of the carriage and the fence, at least one of the menus including at least one touch sensitive button to calibrate the fence by generating signals that cause the computer to move the fence to a zero position adjacent the saw blade.

The control system can include a computer to actuate the motor to move the carriage-fence assembly along the rail; a touch control screen mounted on the fence and moving simultaneously with the fence; and, a plurality of inter-related operational menus operatively associated with the computer and displayed sequentially on the screen and including button images activated by touch to generate signals to the computer to move from one of the menus to another of the menus and to control movement of the carriage and the fence.

Turning now to the drawings, which depict the presently preferred embodiments of the invention for the purpose of illustrating the practice thereof and not by way of limitation of the scope of the invention, and in which like reference characters refer to corresponding elements throughout the several views, FIGS. 5 to 16 illustrate various menus that appear on the touch sensitive screen 20 utilized in the preferred embodiment of the invention. The touch sensitive screen is installed on fence 12 in place of the push buttons shown on the prior art fence illustrated in FIG. 1. The touch sensitive screen 20 occupies an area that is generally equivalent to the area occupied by the push buttons shown in FIG. 1, although the space on fence 12 that is occupied by the touch sensitive screen 20 can vary as desired.

Screen 20 can be constructed in any desired manner provided that when control buttons appear on the screen, the control buttons each can be activated by a user, typically either by the user placing a finger adjacent but spaced apart from screen 20 and over a control button, by the user touching with his finger screen 20 at a point over a control button, or by the user pressing with his finger screen 20 at a point over a control button. The construction and functioning of various touch sensitive screens or displays is well known and will not be explained in detail herein.

As will be seen, screen 20 is operatively associated with the computer. The computer, typically a microprocessor, directs which menus appear on screen 20 and also serves as an interface between screen 20 and motor 1. Power for the computer, saw, screen 20, etc. can be provided from a 120 volts wall outlet, from batteries, from solar energy, or from any other desired source.

Figure 5:
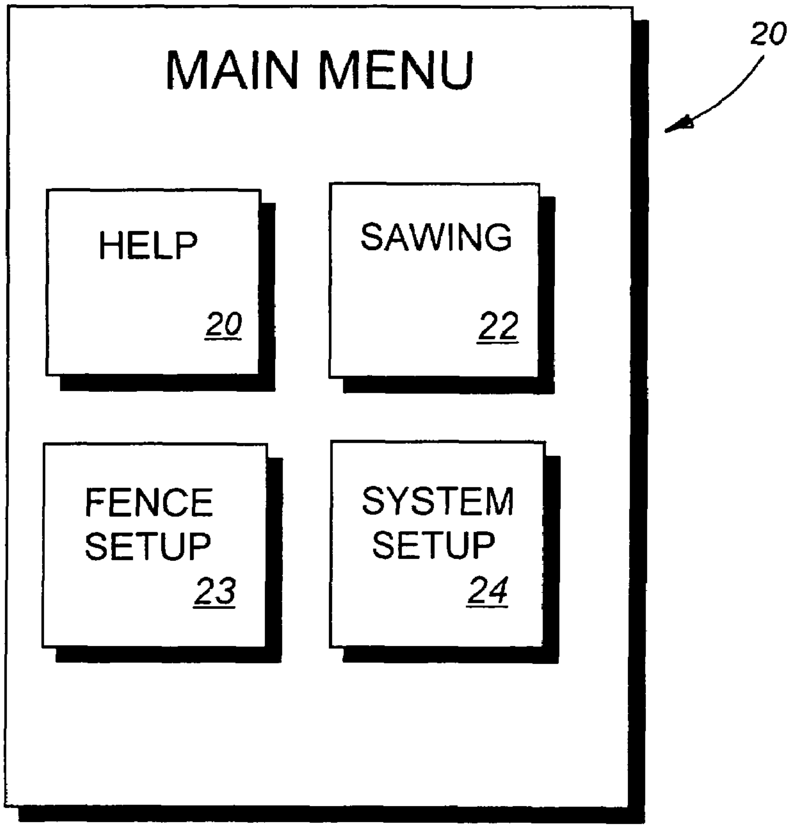
FIG. 5 is a top view illustrating the touch sensitive screen utilized in the presently preferred embodiment of the invention in place of a keypad.

FIG. 5 illustrates the MAIN MENU as it appears on screen 20. When an operator initially begins to utilize screen 20 to operate the apparatus of FIG. 1, the MAIN MENU ordinarily is on screen 20. The operator touches his finger to screen 20 on the HELP button 21. A signal is sent to the computer. The computer causes the MAIN MENU to be removed from screen 20 and causes the HELP MENU illustrated in FIG. 13 to appear on screen 20. The HELP MENU includes the explanation 91 "SET THE FENCE FOR EITHER RIGHT SIDE OR LEFT SIDE SAWING. THEN PRESS SAWING FROM THE MAIN MENU. PRESSING THE SETUP KEY WILL SWITCH BETWEEN DECIMAL, METRIC, AND FRACTION MODES." After the operator reads explanation 91, the operator touches his finger to screen 20 on the OK button. A signal is sent to the computer. The computer causes the HELP MENU to disappear from screen 20 and causes the MAIN MENU of FIG. 5 to reappear on screen 20.

The operator touches his finger to screen 20 on the SYSTEM SETUP button 24. A signal is sent to the computer. The computer causes the MAIN MENU to disappear from screen 20 and causes the SYSTEM SETUP MENU illustrated in FIG. 10 to appear on screen 20. The SYSTEM SETUP MENU includes the SET CONTRAST button 79, the SYSTEM TEST button 80, the TOGGLE BUZZER button 81, and the MAIN MENU button 82.

If the operator touches the TOGGLE BUZZER button 81, a signal is sent to the computer. The computer causes the SYSTEM SET UP MENU to disappear from screen 20 and causes the TOGGLE BUZZER MENU (not shown) to appear. The TOGGLE BUZZER MENU includes an ON button, an OFF button, and an OK button. When the operator touches the OK button, a signal is sent to the computer. The computer causes the TOGGLE BUZZER MENU to disappear from screen 20 and causes the SYSTEM SET UP MENU of FIG. 10 to reappear on screen 20. The toggle buzzer functions to produce a sound each time the operator touches screen 20 to actuate a button. The sound is confirmation to the operator that the button was actuated. The ON button turns the toggle buzzer on. The OFF button turns the toggle buzzer off.

The operator touches the SET CONTRAST button 79. A signal is sent from screen 20 to the computer. The computer causes the SYSTEM SET UP MENU of FIG. 10 to disappear from screen 20 and causes the ADJUST CONTRAST MENU of FIG. 11 to appear on screen 20. The ADJUST CONTRAST MENU includes PLUS button 83, MINUS button 84, and OK button 85. The contrast on screen 20 slowly increases when the operator holds his finger against screen 20 over button 83. When the operator holds his finger against screen 20 over button 83, signals are sent to the computer and the computer generates signals to screen 20 that cause the contrast to increase. The contrast on screen 20 slowly decreases when the operator holds his finger against screen 20 over button 84. When the operator holds his finger against screen 20 over button 84, signals are sent to the computer and the computer generates signals to screen 20 that cause the contrast of images depicted on screen 20 to decrease. When the operator touches screen 20 over the OK button 85, a signal is generated and sent to the computer. The computer causes the ADJUST CONTRAST MENU to disappear from screen 20 and causes the SYSTEM SET UP MENU of FIG. 10 to reappear on screen 20.

The user touches screen 20 over the SYSTEM TEST button 80. A signal is generated and sent to the computer. The computer receives the signal and generates signals to screen 20 that cause the SYSTEM SET UP MENU of FIG. 10 to disappear from screen 20 and cause the SYSTEM TEST MENU of FIG. 12 to appear on screen 20.

The SYSTEM TEST MENU includes START button 86, STOP button 87, TEST 3 button 88, TEST 4 button 89, and MAIN MENU button 90. When the user touches screen 20 over the START button 86, a signal is generated and sent to the computer. The computer runs a diagnostic test to insure that screen 20, the toggle buzzer, the motor 1, and the control program in the computer are operating properly. If the test is completed and indicates the system is operating properly, the computer automatically causes the SYSTEM TEST menu to disappear from screen 20 and causes the SYSTEM SET UP MENU of FIG. 10 to reappear on the screen 20. After the START button 86 is actuated by the operator by touching screen 20 over button 86, the operator is free at any time to stop the test by depressing the STOP button 87. The operator is also free at any time to stop the test by returning to the MAIN MENU of FIG. 5 by touching screen 20 over the MAIN MENU button 90. Pressing any of the TEST 3, TEST 4, TEST 5, and TEST 6 buttons generates a signal to the computer that causes the computer to generate signals to screen 20 that cause the SYSTEM TEST MENU of FIG. 12 to disappear from screen 20 and that cause a demonstration of how to use the system to be displayed on screen 20. The operator can at any time during such a demonstration return to the MAIN MENU by touching screen 20 over the MAIN MENU button 90.

The operator touches screen 20 over the MENU BUTTON 90. A signal is generated and sent to the computer. The computer generates signals that cause the SYSTEM TEST MENU of FIG. 12 to disappear from screen 20 and that cause the MAIN MENU of FIG. 5 to reappear on screen 20.

The operator touches screen 20 over the FENCE SETUP button 23. A signal is generated and sent from screen 20 to the computer. The computer generates signals to screen 20 that cause the MAIN MENU of FIG. 5 to disappear from screen 20 and that cause the FENCE SETUP MENU of FIG. 14 to appear on screen 20. The FENCE SETUP MENU includes the SETUP RIGHT button 93, SETUP LEFT button 94, and MAIN MENU button 95. The operator uses the SET UP RIGHT button 93 when the fence 12 will be to the right of the saw blade, and uses the SET UP LEFT button 94 when the fence 12 will be to the left of the saw blade. The operator can at any time touch screen 20 at a point located over the MAIN MENU button 95 and the computer will cause the FENCE SETUP MENU to disappear from screen 20 and will cause the MAIN MENU of FIG. 5 to reappear on screen 20.

If the operator touches screen 20 over the SETUP RIGHT button 93, screen 20 generates a signal and sends it to the computer. The computer generates signals to screen 20 that cause the FENCE SETUP MENU of FIG. 14 to disappear from screen 20 and that cause the ZERO FENCE RIGHT SIDE MENU of FIG. 15 to appear. The ZERO FENCE RIGHT SIDE MENU includes the instructions 96:

TURN OFF POWER TO SAW.
PRESS "GO" TO ZERO THE FENCE.

If the fence were on the left side of the saw blade at the time the ZERO FENCE RIGHT SIDE MENU appeared on screen 20, the computer would know this fact based upon the number of rotations of stepper motor 1, and, as a consequence, the instructions 96 would read:

TURN OFF POWER TO SAW.
LOWER THE SAW BLADE (FENCE IS ON LEFT SIDE OF BLADE.).
THEN PRESS "GO" TO ZERO THE FENCE.

Figure 14:
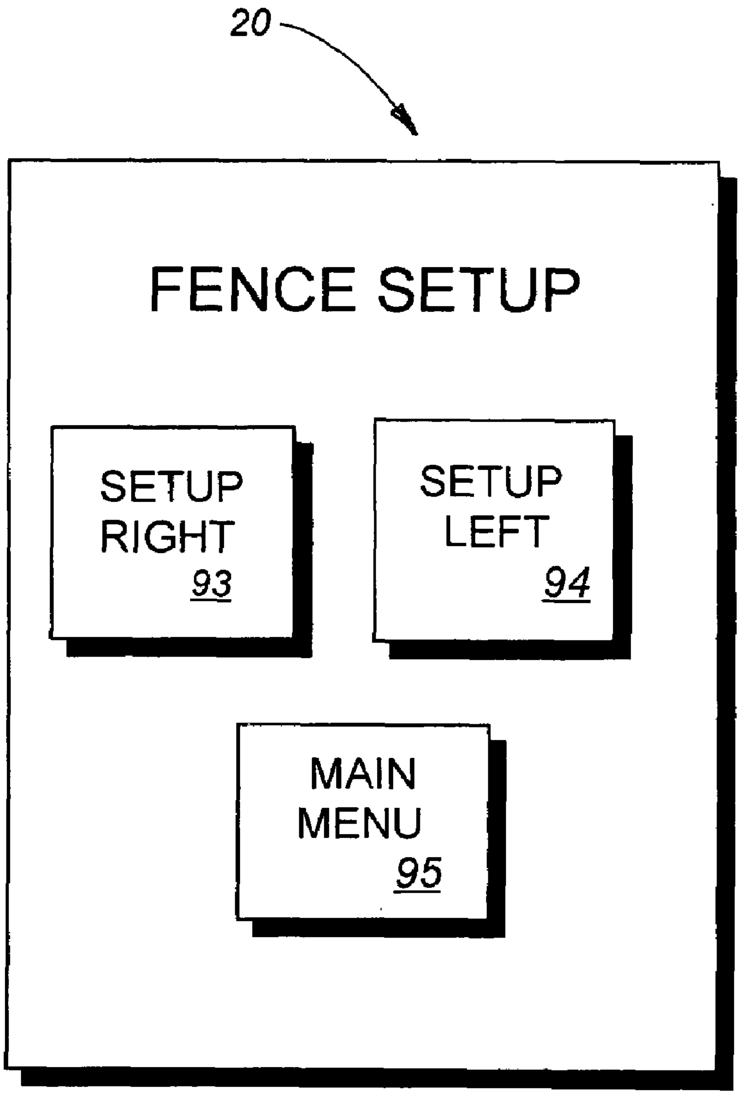
FIG. 14 is a top view of the touch screen illustrating the "FENCE SETUP" display and control buttons.
Figure 15:
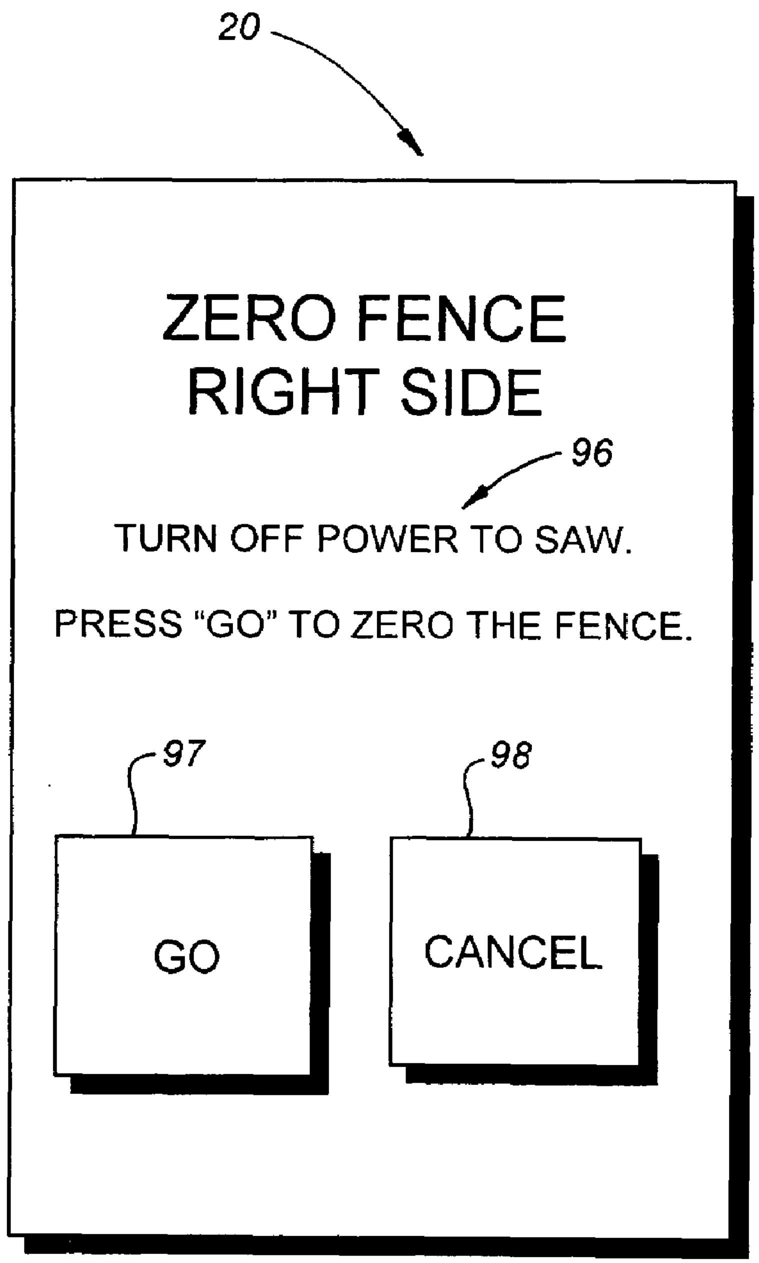
FIG. 15 is a top view of the touch screen illustrating the "ZERO FENCE RIGHT SIDE" display and control buttons.

The ZERO FENCE RIGHT SIDE MENU of FIG. 15 also includes the GO button 97 and the CANCEL BUTTON 98. When the operator touches screen 20 over CANCEL button 98 to activate button 98, screen 20 generates a signal and transmits the signal to the computer. The computer causes the ZERO FENCE RIGHT SIDE MENU of FIG. 15 to disappear from screen 20 and causes the FENCE SETUP MENU of FIG. 14 to reappear on screen 20. When the operator touches screen 20 above the GO button 97, screen 20 generates a signal to the computer. The computer generates a signal to motor 1 that cause motor 1 to move fence 12 to a position in which fence 12 is immediately adjacent the right hand side of the saw blade when the saw blade is in a raised position like that illustrated in FIG. 1.

If, instead of touching screen 20 over button 93 in the FENCE SETUP MENU, the operator touches screen 20 over the SETUP LEFT button 93, screen 20 generates a signal and sends it to the computer. The computer generates signals to screen 20 that cause the FENCE SETUP MENU of FIG. 14 to disappear from screen 20 and that cause the ZERO FENCE LEFT SIDE MENU of FIG. 16 to appear. The ZERO FENCE LEFT SIDE MENU includes the instructions 99:

TURN OFF POWER TO SAW.
LOWER THE SAW BLADE (FENCE IS ON RIGHT SIDE OF BLADE.).
THEN PRESS "GO" TO ZERO THE FENCE.

If the fence were on the left side of the saw blade the time the ZERO FENCE RIGHT SIDE MENU appeared on screen 20, computer would know this fact based upon the number of rotations of stepper motor 1, and, as a consequence, the instructions 96 would read:

TURN OFF POWER TO SAW.
THEN PRESS "GO" TO ZERO THE FENCE.

Figure 16:
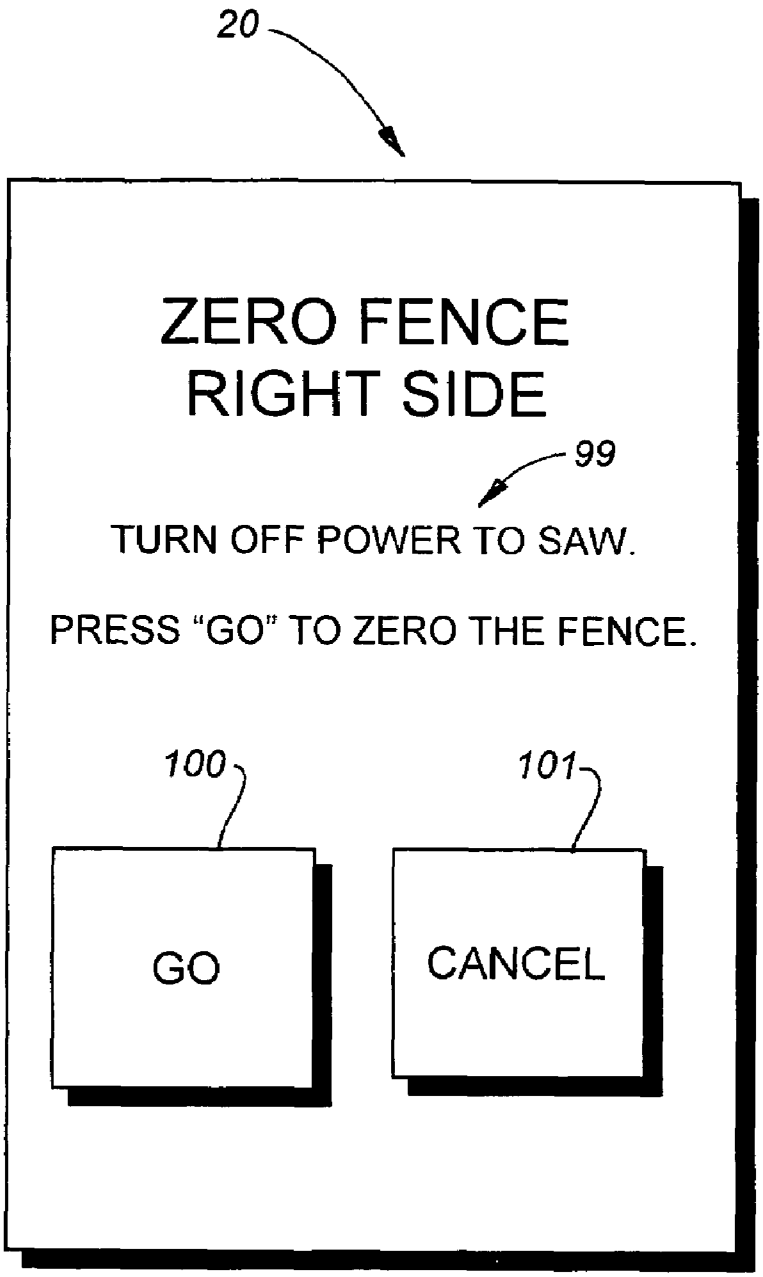
FIG. 16 is a top view of the touch screen illustrating the "ZERO FENCE LEFT SIDE" display and control buttons.

The ZERO FENCE LEFT SIDE MENU of FIG. 16 also includes the GO button 100 and the CANCEL BUTTON 101. When the operator touches screen 20 over CANCEL button 101 to activate button 101, screen 20 generates a signal and transmits the signal to the computer. The computer causes the ZERO FENCE LEFT SIDE MENU of FIG. 16 to disappear from screen 20 and causes the FENCE SETUP MENU of FIG. 14 to reappear on screen 20. When the operator touches screen 20 above the GO button 100, screen 20 generates a signal to the computer. The computer generates a signal to motor 1 that causes motor 1 to move fence 12 to a position in which fence 12 is immediately adjacent the left hand side of the saw blade when the saw blade is in a raised position like that illustrated in FIG. 1. Moving the fence 12 to a "zero" position adjacent the right or left side of the saw blade defines a reference point from which the fence 12 can be moved a selected distance away from the saw blade in preparation of cutting a work piece. If desired, a light or other sensor can be incorporated in fence to assist in determining if fence 12 is, when the fence is in the zero position, a selected distance away from the saw blade. When the fence 12 is in the zero position on the left or right side of the saw blade, it may be desirable to have the fence 12 touching the saw blade.

After the operator has "zeroed" the fence using one of the menus illustrated in FIGS. 15 and 16 and has touched screen 20 over button 98 or 101, respectively, the computer causes the FIG. 15 or FIG. 16 menu, as the case may be, to disappear from screen 20 and causes the FENCE SETUP MENU of FIG. 14 to reappear on screen 20. The operator touches screen 20 over the MAIN MENU button 95. The computer causes the FENCE SETUP MENU of FIG. 14 to disappear from screen 20 and causes the MAIN MENU of FIG. 5 to reappear on screen 20. The operator touches screen 20 over the SAWING button 22. Screen 20 generates a signal to the computer. The computer causes the MAIN MENU of FIG. 5 to disappear from screen 20 and causes the MIXED NUMBER MENU #1 of FIG. 6 to appear on screen 20.

Figure 6:
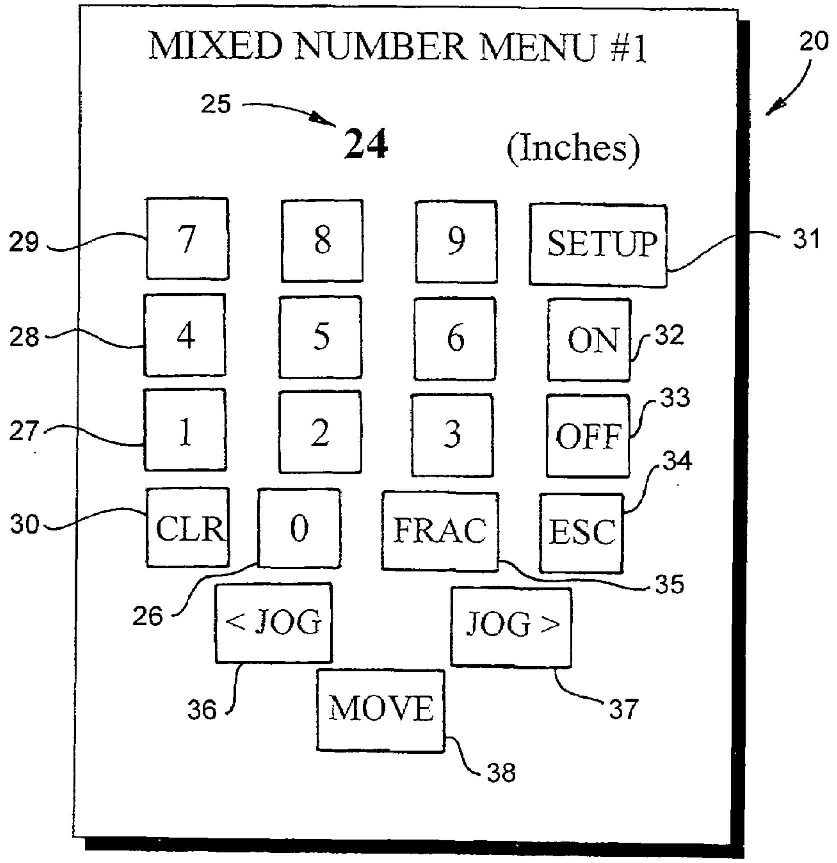
FIG. 6 is a top view of the touch screen illustrating the "MIXED NUMBER MENU #1" display and control buttons.

The MIXED NUMBER MENU #1 includes a display 25 that identifies with numerals the number of inches entered by the operator. In FIG. 6 the display 25 consists of the number "2" that the user entered by touching the "2" button and "4" button in the manner described below. As is indicated in the MIXED NUMBER MENU #1, the display 25 indicates the selected entry in inches. As can be seen in FIG. 6, the MIXED NUMBER MENU #1 includes a button for each integer one to nine, namely, a "0" button, "1" button (reference character 27), "2" button, "3" button, "4" button (reference character 28), "5" button, "6" button, "7" button (reference character 29), "8" button, and "9" button. The MIXED NUMBER MENU #1 also includes SETUP button 31, ON button 32, OFF button 33, ESC button 34, FRAC button 35, CLR button 30, <JOG button 36, JOG> button 37, and MOVE button 38.

When the operator touches screen 20 over one of the integer buttons "1", "2", "3", "4", etc. a signal is generated and sent to the computer and the computer causes the integer on the button to appear in display 25. Accordingly, to produce the number "24" shown in display 25 in FIG. 6, the operator touched the screen 20 over the "2" button to enter the "2" shown in display 25, and then touched the screen 20 over the "4" button (reference character 28) to enter the "4" shown in display 25.

When the operator touches screen 20 over SETUP BUTTON 31, a signal is generated and sent to the computer. The computer causes the MIXED NUMBER MENU #1 to disappear from screen 20 and causes the METRIC MENU of FIG. 8 to appear on screen 20. Similarly, when the operator touches screen 20 over the SETUP BUTTON 55 on the METRIC MENU, a signal is generated and sent to the computer. The computer causes the METRIC MENU to disappear from screen 20 and causes the DECIMAL MENU of FIG. 9 to appear on screen 20. And, similarly, when the operator touches screen 20 over the SET BUTTON 71 on the DECIMAL MENU, a signal is generated and sent to the computer. The computer causes the DECIMAL MENU to disappear from screen 20 and causes the MIXED NUMBER MENU #1 FIG. 6 to appear on screen 20. Accordingly, the operator can switch between the menus of FIGS. 6, 8 and 9 using the SETUP button in the menus.

When the operator touches screen 20 over the ON button 32, the computer turns the saw on. When the operator touches screen 20 over the OFF button 33, the computer turns the saw off. When the operator touches screen 20 over the ESC button 34, a signal is generated to the computer. The computer causes the MIXED NUMBER MENU #1 disappear from screen 20 and causes the MAIN MENU of FIG. 5 to return to the screen 20. When the operator touches screen 20 over the CLR button 30, a signal is generated to the computer and the computer clears or zeros display 25 such that there is no number showing.

When the operator touches screen 20 over the <JOG button 36, a signal is generated to the computer. The computer generates a signal to motor 1 that causes the motor to turn rod 2 to move the fence one-eighth of an inch (or some other selected distance) to the left. Each time the operator touches screen 20 over button 36, the computer causes motor 1 to move or jog the fence one-eighth of an inch to the left. Similarly, when the operator touches screen 20 over the JOG> button 37, a signal is generated to the computer. The computer generates a signal to motor 1 that causes the motor to turn rod 2 to move the fence one-eighth of an inch (or some other selected distance) to the right. Each time the operator touches screen 20 over button 36, the computer causes motor 1 to move or jog the fence one-eighth of an inch to the right.

When the operator touches screen 20 over the MOVE button 38, a signal is generated to the computer and the computer commands the motor 1 to move fence 12 the distance in inches shown in display 25. If the fence 12 is located on the right of the saw blade, the motor 1 moves the fence in a direction to the right and away from the saw blade. If the fence 12 is located on the left of the saw blade, the motor 1 moves the fence in a direction to the left and away from the saw blade. The memory in the computer monitors and knows the position of the fence 12 with respect to the saw blade based upon the prior movements of the fence 12, and based upon the computer's ability to monitor the "steps" of motor 2 and to correlate the number of steps with the distance traveled by fence 12 due to rotation of the threaded rod 2. Programming the computer to correlate the lateral distance traveled by fence 12 with the steps or rotation of motor 1 is a straight forward matter.

When the operator touches screen 20 above the CLR button 30, a signal is generated to the computer and the computer generates signals that erase any numbers entered in display 25.

Figure 7:
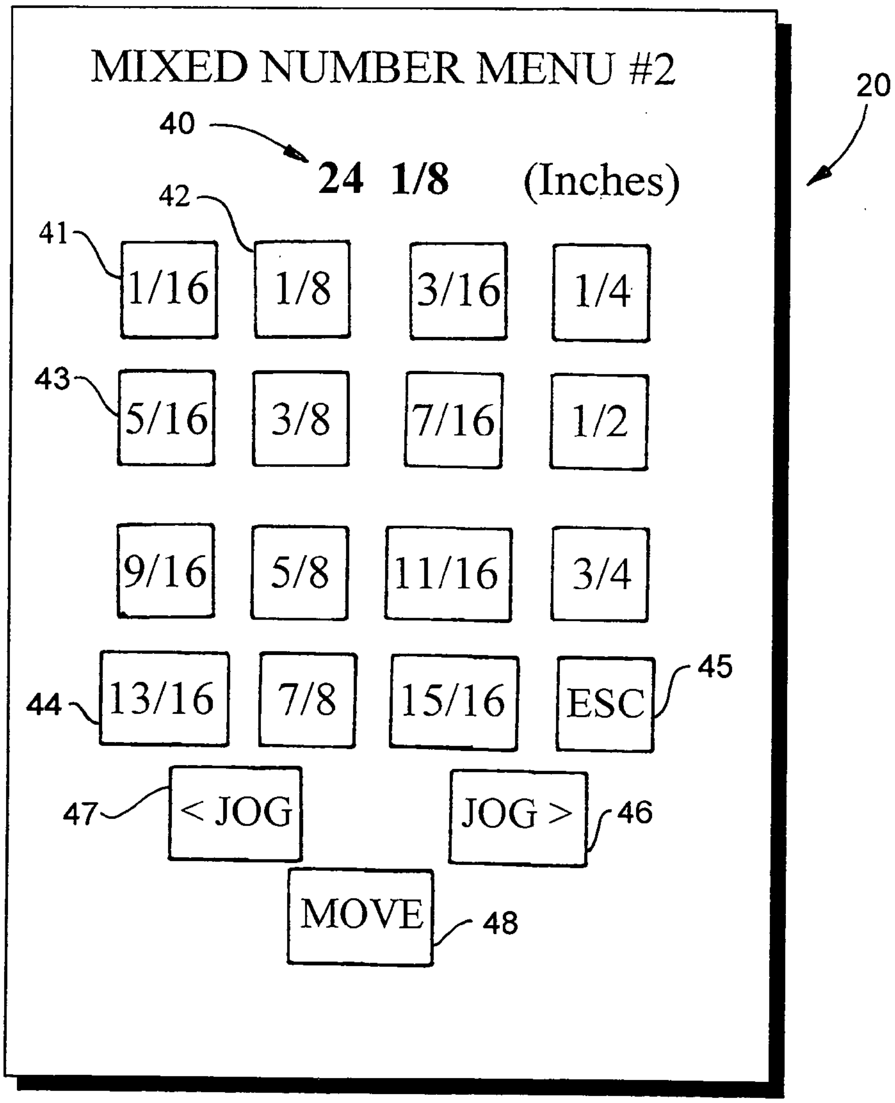
FIG. 7 is a top view of the touch screen illustrating the "MIXED NUMBER MENU #2" display on the touch screen and control buttons.

When the operator touches screen 20 above the FRAC button 35 to actuate button 35, a signal is generated and sent to the computer. The computer generates signals to screen 20 that cause the MIXED NUMBER MENU #1 to disappear from screen 20 and that cause the MIXED NUMBER MENU #2 of FIG. 7 to appear on screen 20. The MIXED NUMBER MENU #2 includes a display 40 that comprises either a whole number, a fraction, or a whole number and a fraction. In FIG. 7, display 40 comprises the mixed number of "24⅛" that the user entered by touching the "2" button and "4" button on MIXED NUMBER MENU #1 and by touching the "⅛" button (reference character 42) on MENU #2 in the manner described below. As is indicated in the MIXED NUMBER MENU #2, the number display 40 indicates the distance in inches that fence 12 will travel. As can be seen in FIG. 7, the MIXED NUMBER MENU #2 includes—at 1⁄16 inch intervals—a fraction button for each fraction from 1⁄16 to 15⁄16. These fraction buttons include a 13⁄16 button (reference character 44), a 5⁄16 button (reference character 43), a 1⁄16 button (reference character 41), and a ⅛ button (reference character 42). The MIXED NUMBER MENU #2 also includes ESC button 45, <JOG button 47, JOG> button 46, and MOVE button 48.

When the operator touches screen 20 over one of the fraction buttons "1⁄16" (reference character 41), "⅛" reference character 42, "3⁄16", etc., a signal is generated and sent to the computer and the computer causes the fraction displayed on the button to appear in display 40 after any whole number that was previously entered in MIXED NUMBER MENU #1. The whole number entered in display 25 in MIXED NUMBER MENU #1 carries over to display 40 when the operator presses the FRAC button 35 in MENU #1 to move to MENU #2.

When the operator touches screen 20 over the ESC button 45, a signal is generated to the computer. The computer causes the MIXED NUMBER MENU #2 disappear from screen 20 and causes the MIXED NUMBER MENU #1 to return to the screen 20 with only the "24" showing in display 25. Any fraction entered using MENU #2 is eliminated when the operator returns to MENU #2.

When the operator touches screen 20 over the <JOG button 47, a signal is generated to the computer. The computer generates a signal to motor 1 that causes the motor to turn rod 2 to move the fence one-eighth of an inch (or some other selected distance) to the left. Each time the operator touches screen 20 over button 47, the computer causes motor 1 to move the fence one-eighth of an inch to the left. Similarly, when the operator touches screen 20 over the JOG> button 46, a signal is generated to the computer. The computer generates a signal to motor 1 that causes the motor to turn rod 2 to move the fence one-eighth of an inch (or some other selected distance) to the right. Each time the operator touches screen 20 over button 46, the computer causes motor 1 to move the fence one-eighth of an inch to the right.

When the operator touches screen 20 over the MOVE button 48, a signal is generated to the computer and the computer commands the motor 1 to move fence 12 the distance in inches shown in display 40. If the fence 12 is located on the right of the saw blade, the motor 1 moves the fence in a direction to the right and away from the saw blade. If the fence 12 is located on the left of the saw blade, the motor 1 moves the fence in a direction to the left and away from the saw blade. The memory in the computer monitors and knows the position of the fence 12 with respect to the saw blade based upon the prior movements of the fence 12. If the operator touches screen 20 over MOVE button 48 in FIG. 7, the computer receives a signal from screen 20 and commands motor 1 to move fence 12 a distance of 24⅛ inches by turning threaded rod 2 to move carriage 7, to move bracket 11 that is connected to carriage 7, and to move fence 12 that is connected to bracket 11.

Figure 8:
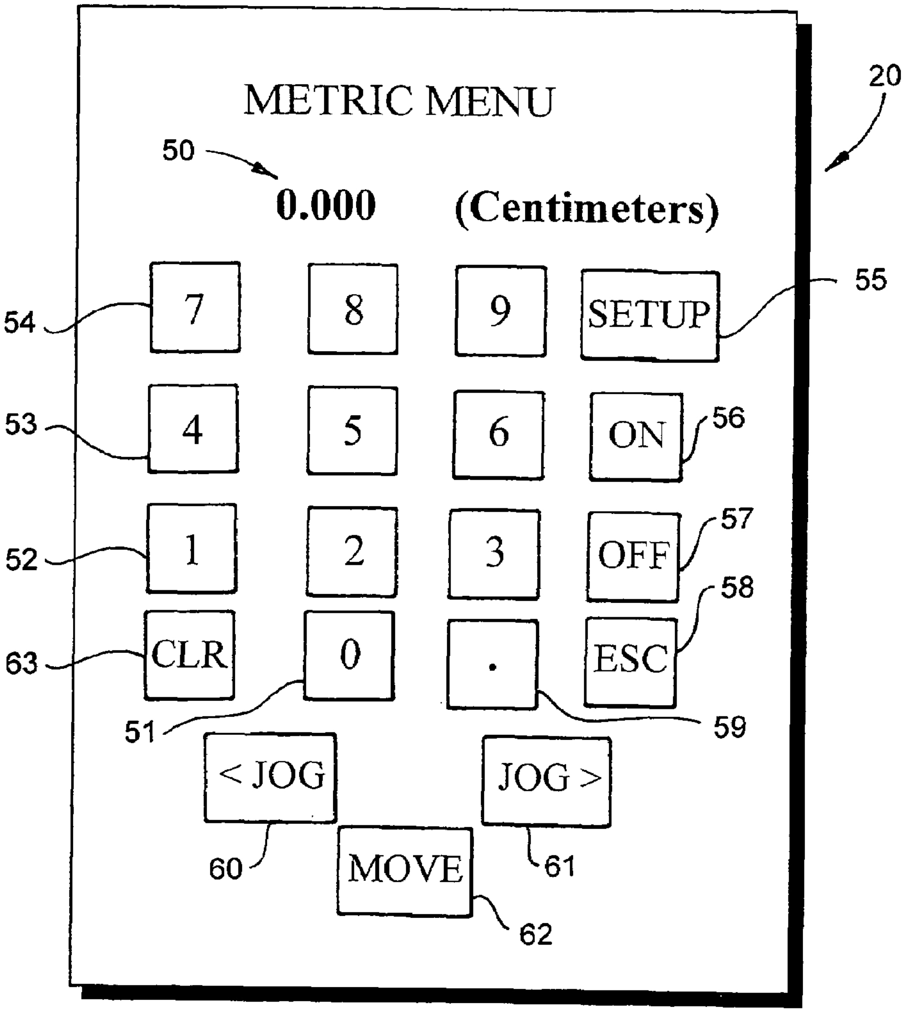
FIG. 8 is a top view of the touch screen illustrating the "METRIC MENU" display and control buttons.

The METRIC MENU illustrated in FIG. 8 includes a display 50 that comprises the number of centimeters entered by the operator. In FIG. 8, the display 50 consists of the integers "0.000" that indicate the operator has not entered a number using the integer buttons noted below. As can be seen in FIG. 8, the METRIC MENU includes a button for each integer one to nine, namely, a "0" button, "1" button (reference character 52), "2" button, "3" button, "4" button (reference character 53), "5" button, "6" button, "7" button (reference character 54), "8" button, and "9" button. The METRIC MENU also includes SETUP button 55, ON button 56, OFF button 57, ESC button 58, <JOG button 60, JOG> button 61, decimal point button 59, and MOVE button 62.

When the operator touches screen 20 over the decimal button 59 or one of the integer buttons "1", "2", "3", "4", etc. a signal is generated and sent to the computer and the computer causes the decimal point or integer displayed on the button to appear in display 25. Accordingly, to produce the number "24.125", the operator would touch the screen 20 sequentially over the "2" button, the "4" button, the decimal button 59, the "1" button (reference character 52), the "2" button, and the "5" button.

When the operator touches screen 20 over SETUP BUTTON 55 on the METRIC MENU, a signal is generated and sent to the computer. The computer causes the METRIC MENU to disappear from screen 20 and causes the DECIMAL MENU of FIG. 9 to appear on screen 20.

When the operator touches screen 20 over the ON button 56 to actuate button 56, the computer generates a signal that turns the saw on. When the operator touches screen 20 over the OFF button 57, the computer generates a signal that turns the saw off. When the operator touches screen 20 over the ESC button 58, a signal is generated to the computer. The computer causes the METRIC MENU to disappear from screen 20 and causes the MAIN MENU of FIG. 5 to return to the screen 20. When the operator touches screen 20 over the CLR button 63, a signal is generated to the computer and the computer clears or zeros display 25 such that display 25 appears as shown in FIG. 8 and there are only "0" integers in display 25.

When the operator touches screen 20 over the <JOG button 60, a signal is generated to the computer. The computer generates a signal to motor 1 that causes the motor to turn rod 2 to move the fence one-eighth of an inch (or some other selected distance) to the left. Each time the operator touches screen 20 over button 60, the computer causes motor 1 to move the fence one-eighth of an inch to the left. Similarly, when the operator touches screen 20 over the JOG> button 61, a signal is generated to the computer. The computer generates a signal to motor 1 that causes the motor to turn rod 2 to move the fence one-eighth of an inch (or some other selected distance) to the right. Each time the operator touches screen 20 over button 61, the computer causes motor 1 to move the fence one-eighth of an inch to the right.

When the operator touches screen 20 over the MOVE button 62, a signal is generated to the computer and the computer commands the motor 1 to move fence 12 the distance in inches shown in display 50. If the fence 12 is located on the right of the saw blade, the motor 1 moves the fence in a direction to the right and away from the saw blade. If the fence 12 is located on the left of the saw blade, the motor 1 moves the fence in a direction to the left and away from the saw blade. The memory in the computer monitors and knows the position of the fence 12 with respect to the saw blade based upon the prior movements of the fence 12.

Figure 9:
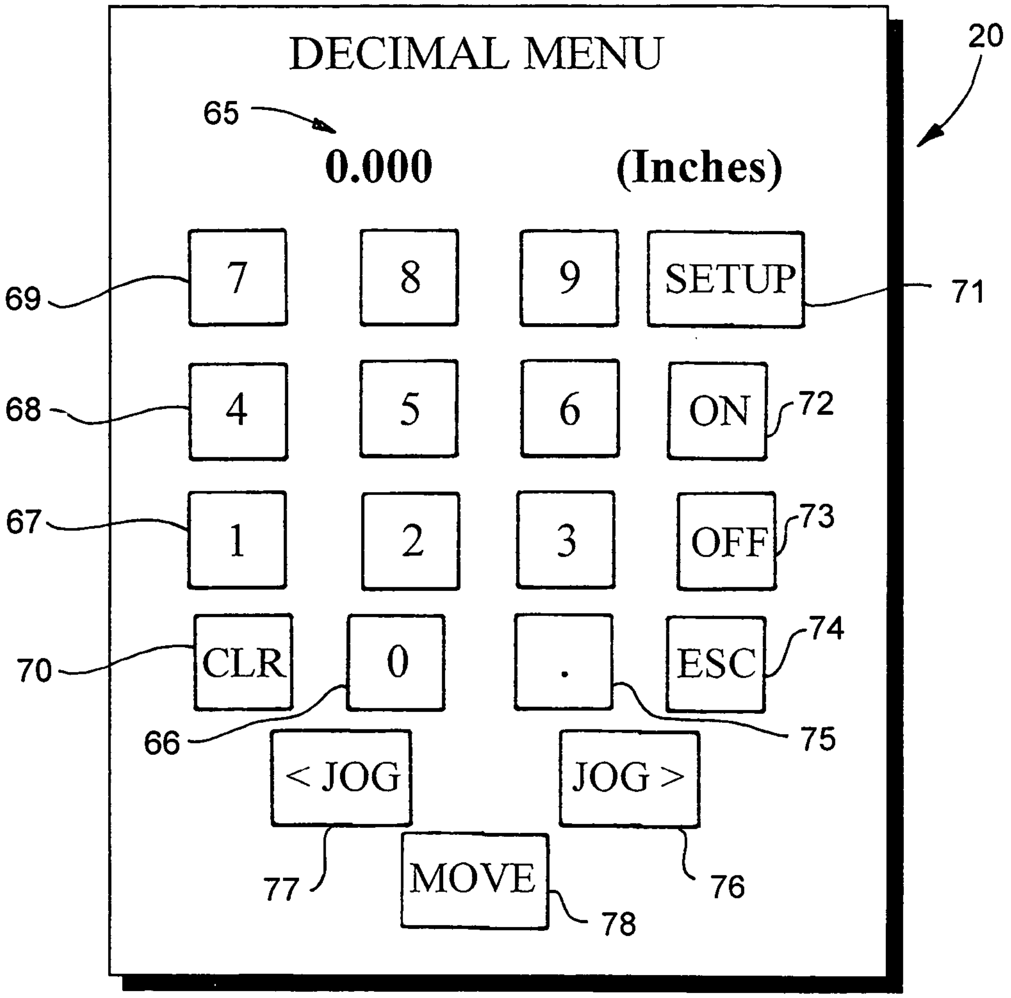
FIG. 9 is a top view of the touch screen illustrating the "DECIMAL MENU" display and control buttons.
Figure 10:
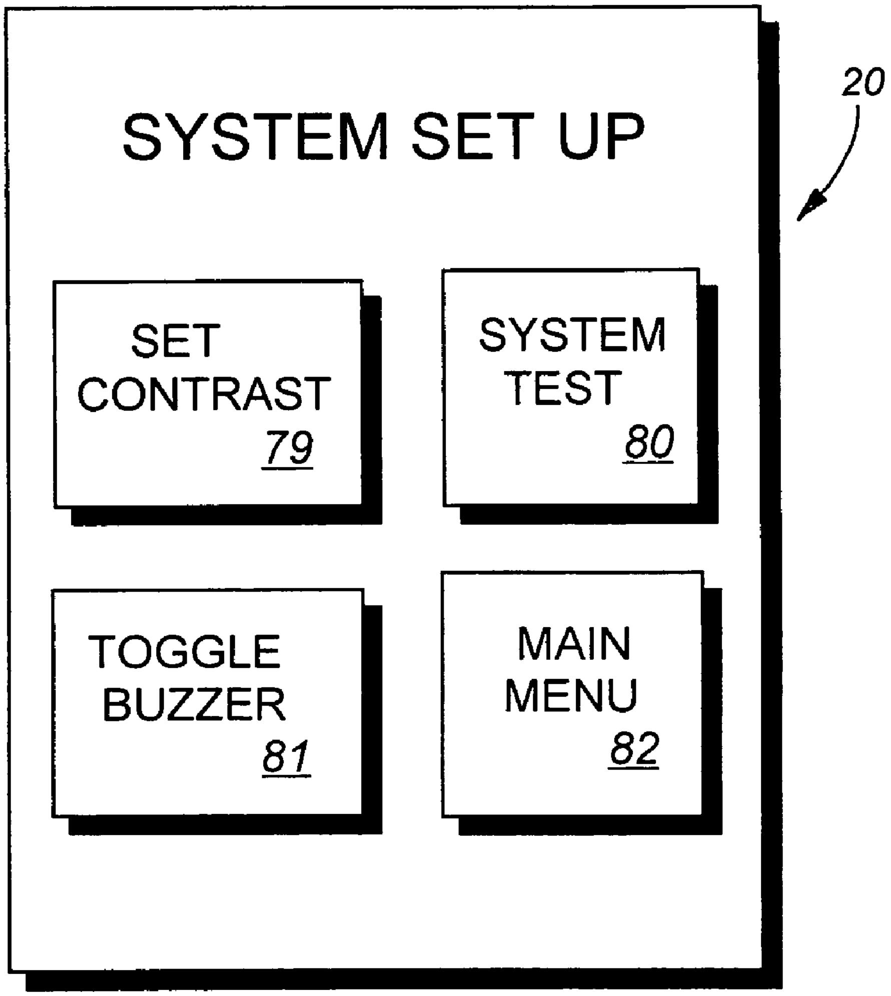
FIG. 10 is a top view of the touch screen illustrating the "SYSTEM SET UP" display and control buttons.
Figure 11:
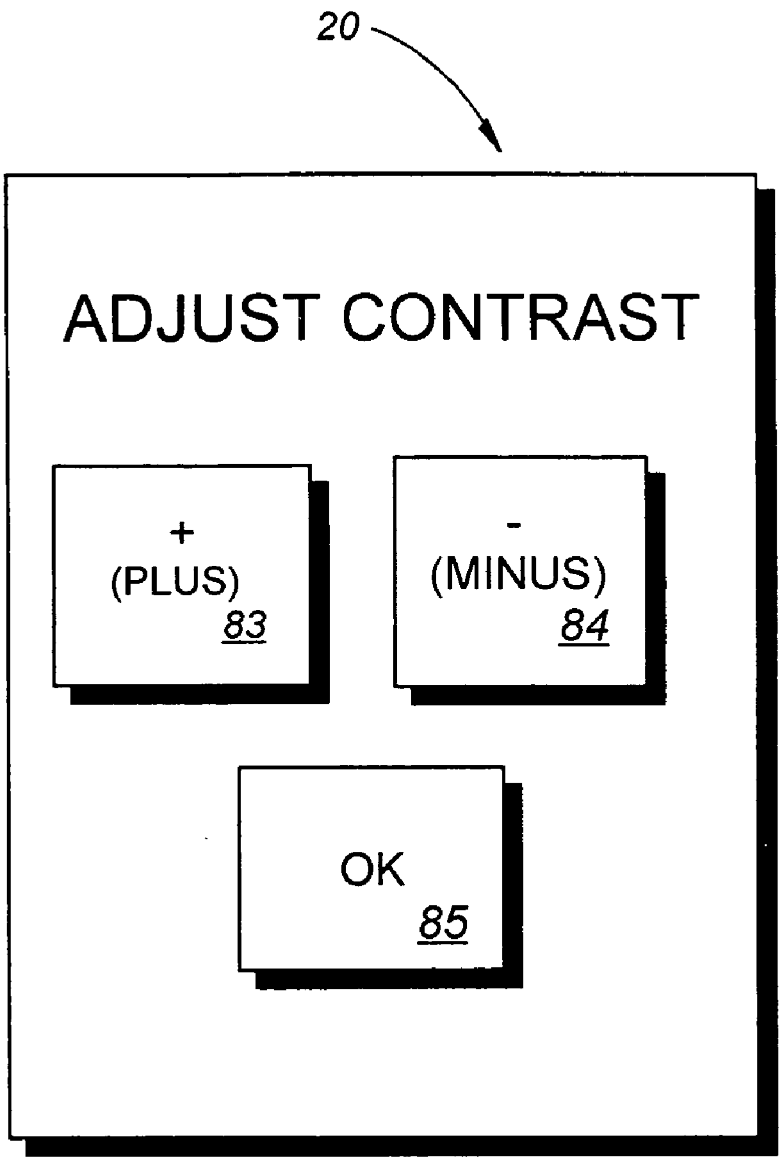
FIG. 11 is a top view of the touch screen illustrating the "ADJUST CONTRAST" display and control buttons.
Figure 12:
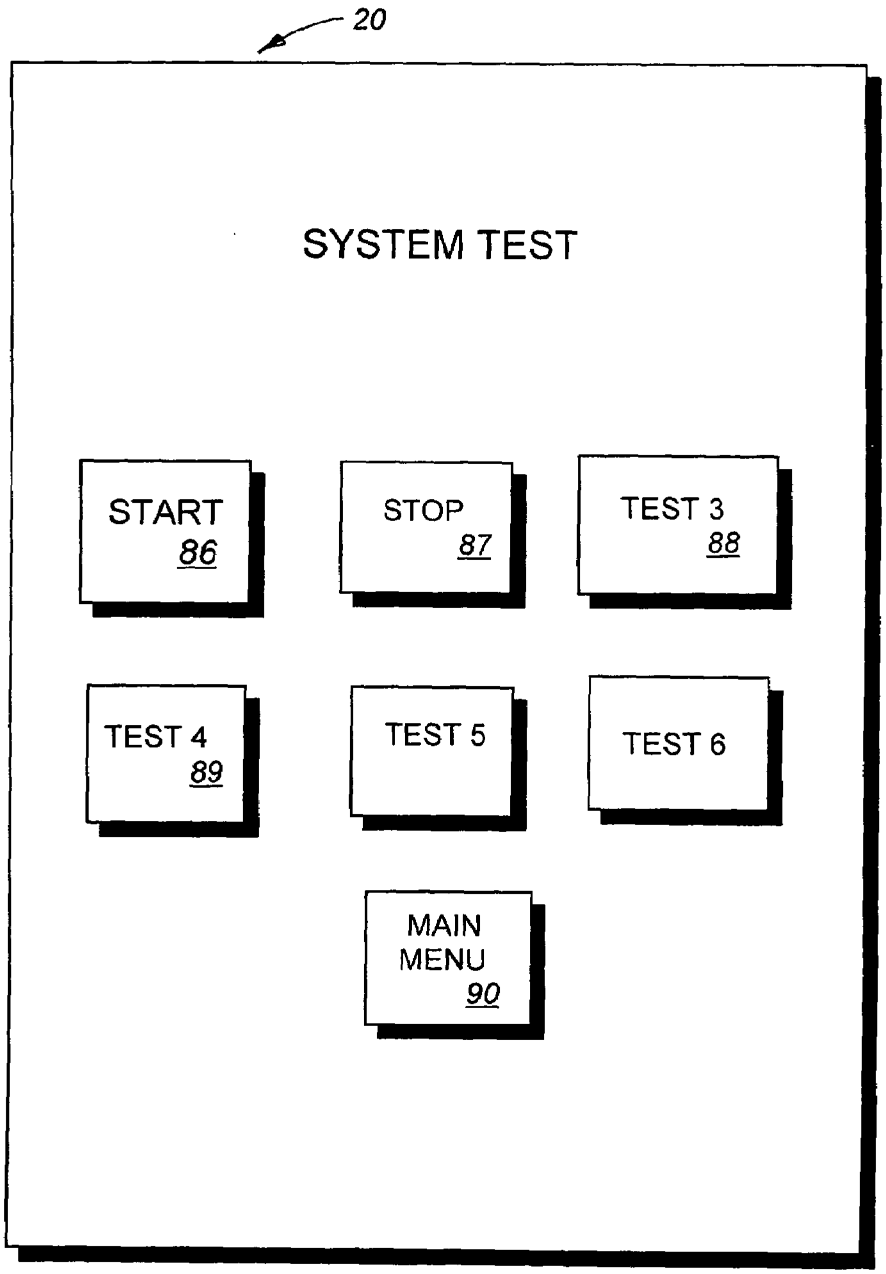
FIG. 12 is a top view of the touch screen illustrating the "SYSTEM TEST" display and control buttons.
Figure 13:
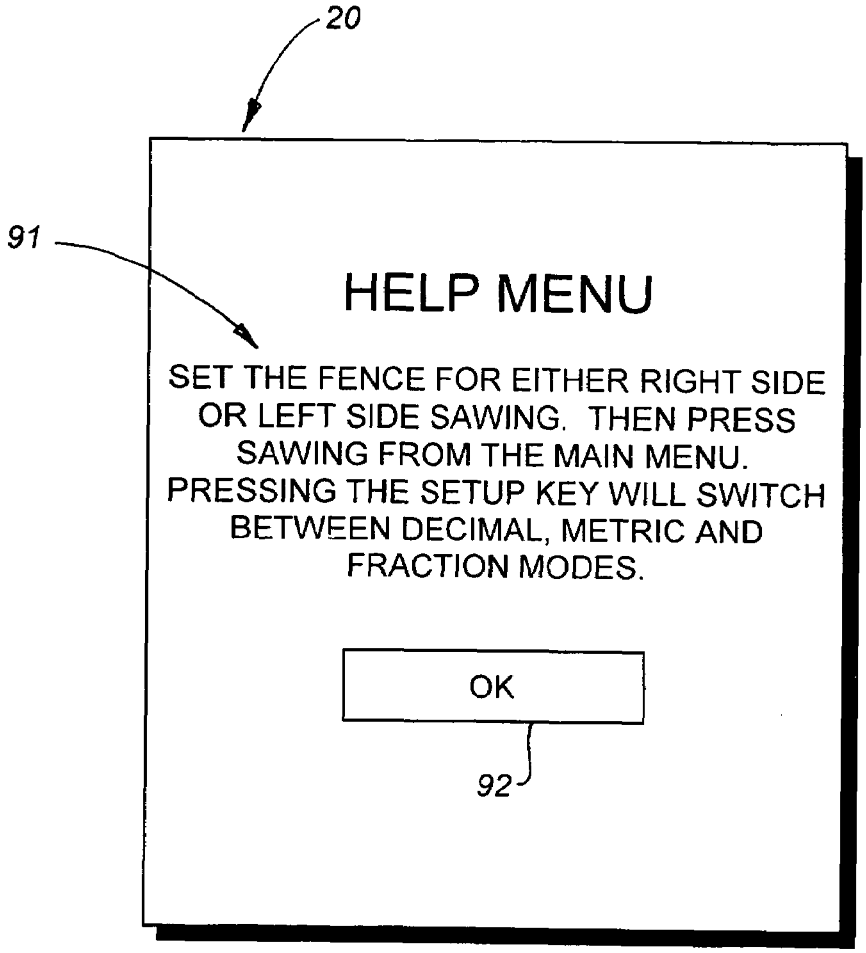
FIG. 13 is a top view of the touch screen illustrating the "HELP MENU" display and control buttons.

The DECIMAL MENU illustrated in FIG. 9 includes a display 65 that comprises the number of inches entered by the operator. In FIG. 9, the display 65 consists of the integers "0.000" that indicate the operator has not entered a number using the integer buttons noted below. As can be seen in FIG. 9, the DECIMAL MENU includes a button for each integer one to nine, namely, a "0" button, "1" button (reference character 67), "2" button, "3" button, "4" button (reference character 68), "5" button, "6" button, "7" button (reference character 69), "8" button, and "9" button. The METRIC MENU also includes SETUP button 71, ON button 72, OFF button 73, ESC button 74, <JOG button 77, JOG> button 76, decimal point button 75, and MOVE button 78.

When the operator touches screen 20 over the decimal button 75 or one of the integer buttons "1", "2", "3", "4", etc., a signal is generated and sent to the computer and the computer causes the corresponding integer or decimal point to appear in display 65. Accordingly, to produce the number "24.125", the operator would touch the screen 20 sequentially over the "2" button, the "4" button, the decimal button 75, the "1" button (reference character 67), the "2" button, and the "5" button.

When the operator touches screen 20 over SETUP BUTTON 71 on the DECIMAL MENU, a signal is generated and sent to the computer. The computer causes the DECIMAL MENU to disappear from screen 20 and causes the MIXED NUMBER MENU #1 of FIG. 6 to appear on screen 20.

When the operator touches screen 20 over the ON button 72, the computer generates a signal that turns the saw on. When the operator touches screen 20 over the OFF button 73, the computer generates a signal that turns the saw off. When the operator touches screen 20 over the ESC button 74, a signal is generated to the computer. The computer causes the DECIMAL MENU to disappear from screen 20 and causes the MAIN MENU of FIG. 5 to return to the screen 20.

When the operator touches screen 20 over the CLR button 70, a signal is generated to the computer and the computer clears or zeros display 65 such that display 65 appears as shown in FIG. 9 and there are only "0" integers in display 65.

When the operator touches screen 20 over the <JOG button 77, a signal is generated to the computer. The computer generates a signal to motor 1 that cause the motor to turn rod 2 to move the fence one-eighth of an inch (or some other selected distance) to the left. Each time the operator touches screen 20 over button 77, the computer causes motor 1 to move the fence one-eighth of an inch to the left. Similarly, when the operator touches screen 20 over the JOG> button 76, a signal is generated to the computer. The computer generates a signal to motor 1 that causes the motor to turn rod 2 to move the fence one-eighth of an inch (or some other selected distance) to the right. Each time the operator touches screen 20 over button 76, the computer causes motor 1 to move the fence one-eighth of an inch to the right.

When the operator touches screen 20 over the MOVE button 78, a signal is generated to the computer and the computer commands the motor 1 to move fence 12 the distance in inches shown in display 65. If the fence 12 is on the right of the saw blade, the motor 1 moves the fence in a direction to the right and away from the saw blade. If the fence 12 is on the left of the saw blade, the motor 1 moves the fence in a direction to the left and away from the saw blade. The memory in the computer monitors and knows the position of the fence 12 with respect to the saw blade based upon the prior movements of the fence 12.

In use, in the majority cases the user will being with the MAIN MENU of FIG. 5 appearing on screen 20; will use the FENCE SETUP MENU (accessed via button 23) to zero the fence to the left or right of the saw blade; and, will use the MIXED NUMBER MENUS, METRIC MENU, or DECIMAL MENU (accessed via button 22) to move the fence 12 the desired distance to the left or right of the saw blade. Once fence 12 is moved the desired distance to the left or right of the saw blade, the ON button 32, 65, or 72 is used to turn the saw on to cut a workpiece placed on and moved over the saw table in conventional fashion.

One important feature of the fence system of the invention is its automatic self-correcting alignment feature. Once the fence is calibrated by moving the fence 12 to its zero position adjacent the saw blade, the computer can readily determine the location of the fence by the number of steps motor 1 take during each revolution both of the motor and of threaded rod 2. Motor 1 typically has 200 or 400 steps per revolution. If fence 12 is inadvertently struck and moved, say one eighth of an inch, the threaded rod 2 turns or rotates to permit fence 12 to move. The stepper motor, and therefore the computer, detects the revolutions or part of a revolution of rod 2 that occur when fence 12 is moved. Once the computer detects movement of fence 12 from its desired position, the computer commands motor 1 to move a number of steps sufficient to rotate rod 2 and return fence 12 to its original position.

Stepper motor 1 (or another kind of motor) and fence 12 can also, if desired, be incorporated into a rack and pinion system for moving fence 12. Stepper motor 1 ordinarily is operated by receiving pulses from the computer or other digital controller. Motor 1 preferably includes an encoder, for example, a five thousand line per revolution encoder. The encoder looks like a tiny motor with a glass disk. Reference lines are etched in the glass disk and facilitate accurate and precise determination of whether fence 12 has been moved from its desired position with respect to the saw blade.

The automated saw table fence system of the invention has the following advantages.

First, the menus set forth in FIGS. 6 to 9 allow the operator to utilize a metric, decimal, or mixed number measurement without having to make any conversion from one measurement system or unit to another. This feature of the invention significantly simplifies use of the fence system and relieves most operators of having to acquire the knowledge to makes such conversions, of having to increase the likelihood of error in making such conversions, and of having to spend the time required to make such conversions.

Second, the system includes an automatic locking system that accurately locks a fence in place. Once the stepper motor or other motor moves the fence to a desired location, the computer stops the stepper motor and the motor (since it has stopped) and threaded rod (since it has stopped) function in tandem to maintain the fence in position.

Third, the locking system is self-correcting. Once the stepper motor moves the fence to a desired location, the computer monitors the stepper motor (or monitors the position of the fence using some other sensor system), and when the computer detects, via the movement of the stepper motor 1, that the threaded rod has turned (and the fence has therefore been moved), the computer generates signals that cause the stepper motor to turn the threaded rod 2 to move the fence 12 back to its desired position. The ability of the fence system of the invention to self-correct automatically the position of the saw fence significantly reduces the time required to operate the saw table.

Fourth, the fence system of the invention provides, via the menus illustrated in FIGS. 14 to 16, a means for rapidly zeroing or calibrating the fence. This new calibration system foregoes the tape measure—multiple calculation routines of the prior art and significantly reduces the time required to operate the saw table.

Fifth, the fence system of the invention enables an operator readily to turn the saw blade on and off using buttons 32-33, 56-57, or 72-73 in the menus illustrated in FIGS. 6, 8, 9. The operator does not, therefore, have to lean over, leave his normal upright working position, or place his face nearer the saw blade in order to turn the saw blade on and off.

Sixth, the fence system of the invention appears to be unusually user friendly and to require only a minimal amount of instruction. The touch screen—correlated menu system of FIGS. 5 to 16 is largely self-explanatory and does not require conversion tables or other mathematical calculations in use.

Seventh, the fence system of the invention does not require a computer keyboard, and therefore does not require the space occupied by a keyboard and does not introduce the operational limitations associated with a computer keyboard.

Eighth, the fence system of the invention does not require the use of a computer monitor and associated mouse.

The incorporation in the fence system of the invention of a fence-mounted touch screen with a plurality of inter-related operational menus tailored to perform specific saw table functions is believed significantly to simplify, to increase the accuracy of, and to make safer conventional saw table operational procedures. Such a system is not believed to exist in the prior art, and it is anticipated that the simplicity and ease of use of the system make it likely that it will be adopted by others.

Only one menu at a time presently appears on screen 20. If desired more than one menu at a time can appear on screen 20, or, one or more menu can "pop-up" and overlay one or more menus on screen 20. Regardless, however, of how the menus appear on screen 20, in use of the fence system of the invention, the menus are used sequentially in the manner described above.

Figure 17:
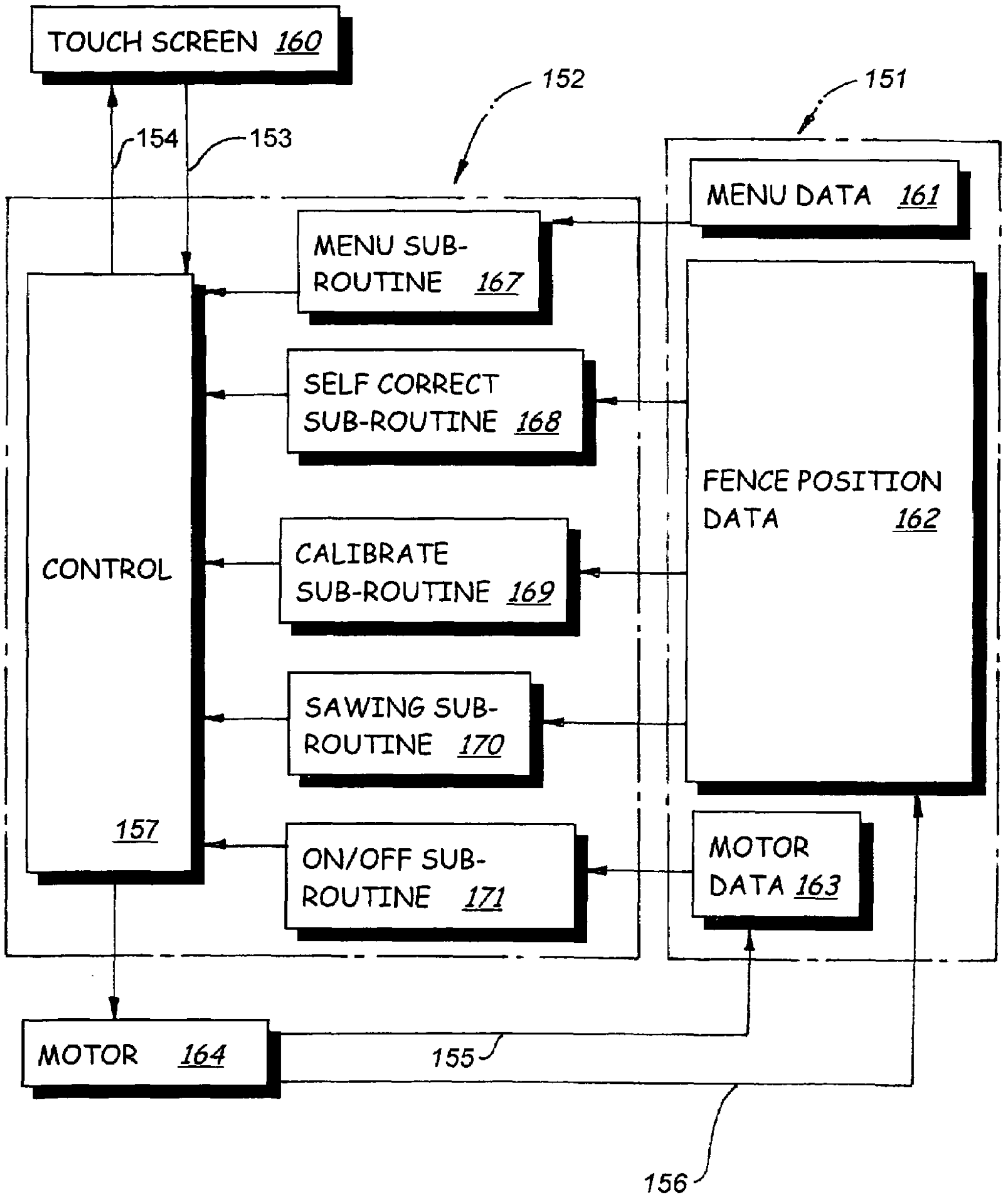
FIG. 17 is a block diagram illustrating the saw table system of the invention.

The above-described saw table control system is further illustrated in FIG. 17. The system includes a microprocessor or other computer including a controller 152 and a memory 151, includes a touch screen 160 (equivalent to touch screen 20 in FIGS. 5 to 16), and includes a motor 164 (equivalent to motor 1 in FIG. 1). Memory 151 includes menu data 161 that is used to produce the menus shown in FIGS. 5 to 16; includes fence position data 162 that is determined from signals 156 from motor 164 that indicate the number of steps motor 164 has taken (or the number of revolutions or partial revolutions of rod 2); and, includes motor data 163 that indicates whether the motor 164 is on or off. The controller 152 includes the menu 167, self correct 168, calibrate 169, sawing 170 and on/off 171 sub-routines. The menu subroutine 167 is utilized by control 157 to produce on touch screen 160 the various menus illustrated in FIGS. 5 to 16 and to produce any other desired menus. The self correct sub routine 168 is used by control to automatically correct the position of fence 12 in the manner earlier described herein after the fence 12 is inadvertently bumped and moved from its desired position. The calibrate sub routine 169 is used by control in conjunction with the menus shown in FIGS. 14 to 16 to set fence 12 to the zero position adjacent the saw blade in the manner earlier described herein. The sawing sub-routine is used by control in conjunction with the menus shown in FIGS. 6 to 9 to set the fence 12 at a desired location for sawing a workpiece in the manner earlier described herein. The on/off sub-routine 171 is used in conjunction with buttons 32 and 33, 56 and 57, or 72 and 73 to turn the motor on and off in the manner earlier described. Control sends 154 signals to screen 160, which signals include but are not limited to the signals necessary to produce the menus illustrated in FIGS. 5 to 16. Control receives 153 signals from screen 160, which signals include but are not limited to the signals produced when the operator touches and actuates a button image that is in one of the images.

Figure 18:
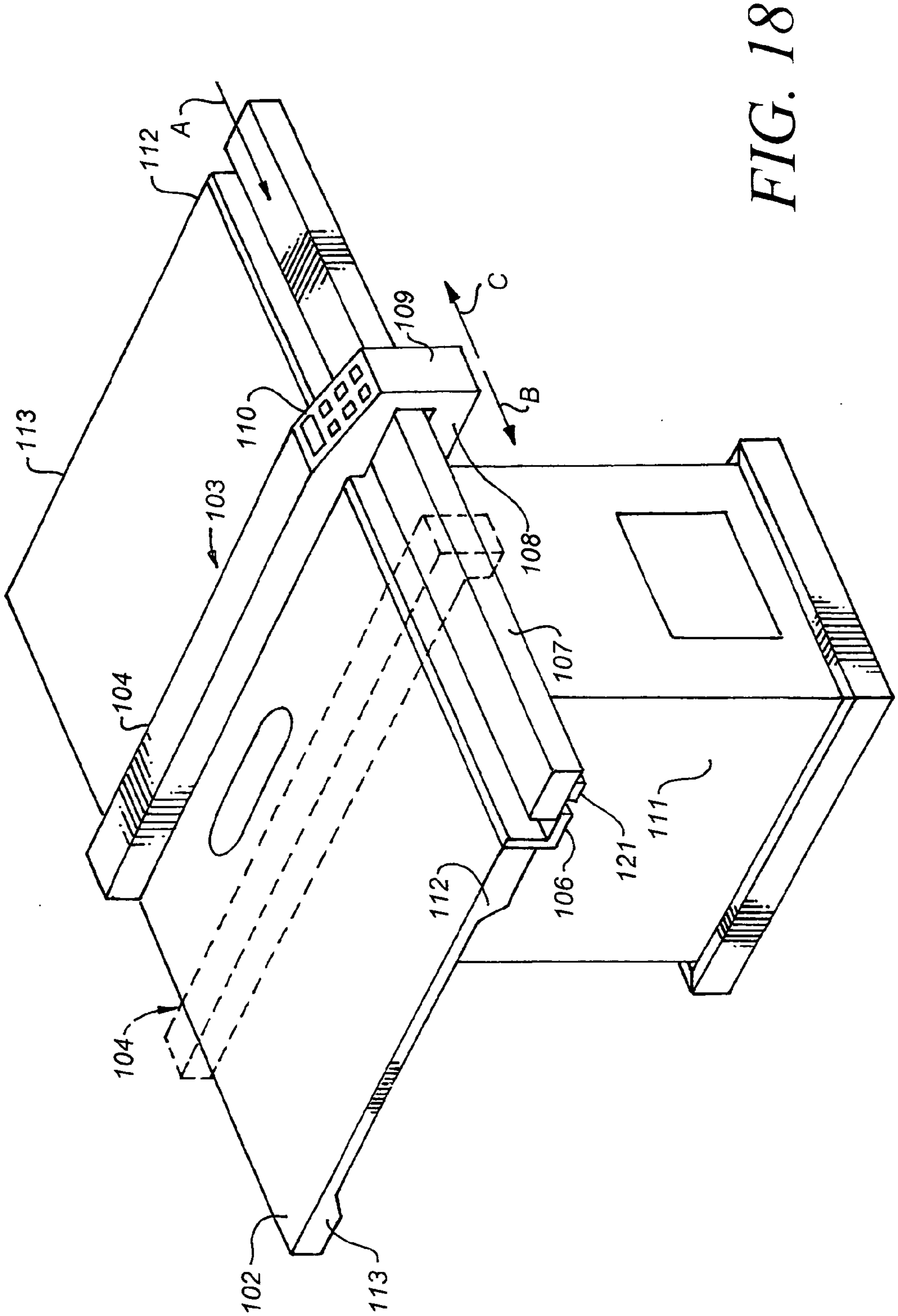
FIG. 18 is a perspective view illustrating an alternate embodiment of the table saw of the invention; and, FIG. 19 is a partial side view of the table saw of FIG. 18 illustrating additional construction details thereof.

FIG. 18 illustrates an alternate embodiment of the table saw of the invention. The table saw includes a free-standing base 111 having a top mounted thereon. The top includes upper horizontally oriented surface 102 and a pair of spaced apart, parallel, opposed, downwardly extending wings or edges 112 and 113. L-shaped support member 106 is connected to wing 112. Elongate orthogonal rail 107 is connected to member 106. Rail 107 is presently preferably a Biesemeyer rail, but the shape and dimension of rail 107 can vary as desired. Rail 107 ordinarily, but not necessarily, is elongate and is horizontally oriented. The rotating saw that is normally found in the table saw of FIG. 18 (which saw is seen in FIG. 1) is omitted in FIG. 18.

Figure 19:
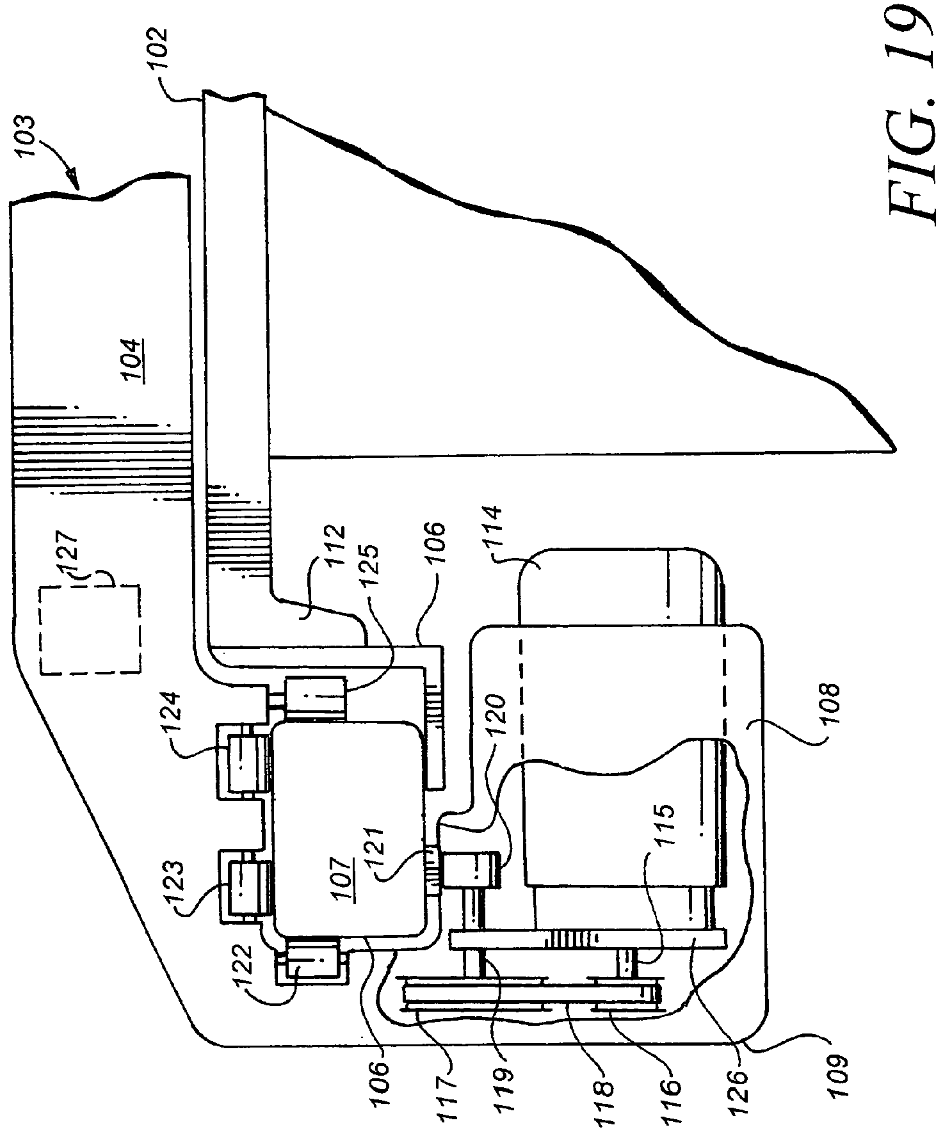

The carriage-fence assembly 103 includes a fence 104 that extends across the horizontally oriented top surface 102 and that is connected to a carriage that is movably mounted on rail 107. A push-button control pad 110 is mounted on the carriage. The carriage includes a housing 108 with outer vertically oriented surface 109. FIG. 19 is a side view of the carriage from the direction indicated by arrow A in FIG. 18.

As is illustrated in FIG. 19, motor 114 is mounted in housing 108. Plate 126 is connected to an extends upwardly from the front of motor 114. Drive shaft 119 is rotatably journalled in the upper end of plate 126. Pulley 117 is on one end of shaft 119 and drive roller (or gear) 120 is on the other end of shaft 119. Drive roller 120 engages elongate strip 121 of rail 107. Strip 121 is on the bottom and extends the length of rail 107. If drive roller 120 is a toothed gear, strip 121 can be provided with teeth to facilitate the engagement of strip 121 by drive roller 120.

If desired, strip 121 can be eliminated and drive roller 120 can contact rail 107 directly; or, any other desired drive structure can be utilized to engage rail 107 such that, as will be described, carriage-fence assembly 103 can move back-and-forth along stationary rail 107.

Pulley 116 is mounted on shaft 115. Shaft 115 extends outwardly from motor 114. Oval "continuous" belt 118 extends intermediate and around pulleys 116 and 119. Motor 114 provides the motive power to rotate shaft 115 and pulley 116. When pulley 116 rotates, it moves belt 118. When belt 118 moves it rotates pulley 117, along with shaft 119 and drive roller 120. When drive roller 120 rotates, it engages strip 121 and causes the carriage-fence assembly 103 to move along rail 107. Rail 107 is fixedly secured to support member 106 and is stationary.

A plurality of rollers 122, 123, 124, 125 are each rotatably mounted on the carriage and rotatably engage rail 107 when the carriage-fence assembly 103 moves along rail 107 in the directions indicated by arrows B and C in FIG. 18. A plurality of rollers can, instead of being mounted on the carriage, be mounted in and along rail 107 such that the carriage contacts and moves over the rollers to move along rail 107. Or, instead of rollers, the rail 107 and/or carriage can be provided with low friction contact surfaces that permit the carriage and rail to contact one another on the lower friction contact surface(s) so the carriage slides along rail 107 when drive roller 120 turns and moves the carriage along rail 107.

Motor 114 can be electrical, hydraulic, etc. An electric servo-motor or a stepper motor are presently preferred. The electric motor can be powered by batteries (not shown), by electricity delivered to motor 114 via a cord (not shown), or by any other desired source of electricity.

Any desired system can be utilized to control motor 114, and to therefore control the movement of the carriage-fence assembly 103. The digital control system illustrated in FIG. 17 and elsewhere herein is presently preferred, especially (but not necessarily) in combination with a touch sensitive screen 20 mounted on the carriage-fence assembly 103. Screen 20 is mounted on assembly 103 in place of and instead of push button control pad 110. Screen 20 is utilized to operate motor 114 in the same manner that screen 20 is, as earlier described herein, utilized to operate motor 1. The microprocessor 127 operatively associated with screen 20 is preferably, but not necessarily, mounted in the carriage-fence assembly 103 as indicated by dashed lines 127 in FIG. 19.

One disadvantage of a touch screen 20 is that it often cannot readily operate at temperatures below thirty-two degrees F. Consequently, for cold climates a push-button control pad 110 or other system that can be manually operated at temperatures below thirty-two degrees F. is preferred. It is also preferred that the carriage-fence assembly 103 be fabricated such that either a touch screen 20 can be connected to or plugged into the assembly 103, or, that another selected manually operated control panel or system can instead be plugged into or connected to assembly 103. This permits ready modification of the control system for cold or warm climates.

It is preferred that rail 107 be a Biesemeyer rail. If a table saw has a rail other than a Biesemeyer rail, one feature of the invention is to sell or otherwise provide the owner of the table saw with a Biesemeyer rail to facilitate the use of carriage-fence assembly 103 when assembly 103 is specifically fabricated to be utilized with a Biesemeyer rail. The Biesemeyer rail provided the owner of an existing table saw is mounted on the table saw after the existing rail on the owner's table saw is removed. The Biesemeyer rail is configured to be mounted on the owner's table saw. When a table saw is provided with a Biesemeyer rail as original equipment, a manually operated fence 104 is typically provided on the rail. This manually operated fence can be, and is, removed from the Biesemeyer rail before the assembly 103 of the invention is mounted on the rail in place of the manually operated fence. Assembly 103 slides or fits over an end of the Biesemeyer rail and rests on the rail 107 in the manner illustrated in FIG. 19.

Having described my invention in such terms as to enable those of skill in the art to make and practice it, and having described the presently preferred embodiments thereof, We claim:

1. A method for retrofitting a table saw, the table saw including a table, a saw mounted on the table, a rail mounted on the table, a carriage removably mounted on the rail for movement therealong, a first fence attached to the carriage, extending over the table, and removable from the rail with the carriage, said method comprising the steps of (a) removing the first fence and carriage from the table saw;

(b) determining if the rail is an elongate, hollow tube rail having a generally rectangular cross section and (i) replacing the rail with an elongate, hollow tube rail having a generally rectangular cross section if the rail is not an elongate, hollow tube rail having a generally rectangular cross section, (ii) leaving the rail on the table saw if the rail is a Biesemeyer rail;

(c) providing a carriage-fence assembly mountable on the elongate, hollow tube rail having a generally rectangular cross section, said carriage-fence assembly including (i) a carriage housing shaped to extend at least partially around the elongate, hollow tube rail having a generally rectangular cross section, (ii) a second fence attached to said carriage housing to extend over the table, (iii) a drive assembly mounted on said carriage housing to engage the rail and move the carriage-fence assembly along the elongate, hollow tube rail having a generally rectangular cross section, (iv) a motor mounted on said carriage housing and operatively associated with said drive assembly to provide motive power for said drive assembly; and, (v) a control system to generate signals to control said motor to control movement of said carriage-fence assembly along the elongate, hollow tube rail having a generally rectangular cross section, said control system including a computer, a touch control screen mounted on said carriage-fence assembly and moving simultaneously with said carriage-fence assembly, a plurality of inter-related operational menus operatively associated with said computer and displayed sequentially on said screen and including button images activated by touch to generate signals to said computer to move from one of said menus to another of said menus and to control movement of said carriage-fence assembly, said menus including at least a first menu to turn the motor on and off, at least second menu to enter the position of said second fence as a mixed number, at least third menu to calibrate said second fence by generating signals that cause the computer to move said second fence to a zero position adjacent the saw blade, at least a fourth menu to enter the position of said second fence as a decimal number, at least a fifth menu to enter the position of said second fence as a metric number, a self-correcting locking system for, once said second fence is moved to a selected position and is stopped, detecting when said second fence is moved from said selected position, and activating the motor to move said second fence back to said selected position;

(d) mounting said carriage-fence assembly on the elongate, hollow tube rail having a generally rectangular cross section of the table saw;

(e) accessing said first menu to turn said motor on;

(f) accessing said third menu to calibrate said second fence;

(g) accessing one of said second, fourth, and fifth menus to enter a selected position of said second fence; and, (h) activating said self-correcting locking system by moving said second fence from said selected position.

* * * * *